US011912058B2

(12) United States Patent
Hayakawa

(10) Patent No.: US 11,912,058 B2
(45) Date of Patent: Feb. 27, 2024

(54) RETRACTABLE WRITING INSTRUMENT

(71) Applicant: Kabushiki Kaisha Pilot Corporation, Tokyo (JP)

(72) Inventor: Hisatoshi Hayakawa, Tokyo (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 70 days.

(21) Appl. No.: 17/423,544

(22) PCT Filed: Jan. 9, 2020

(86) PCT No.: PCT/JP2020/000396
§ 371 (c)(1),
(2) Date: Jul. 16, 2021

(87) PCT Pub. No.: WO2020/149201
PCT Pub. Date: Jul. 23, 2020

(65) Prior Publication Data

US 2022/0072894 A1 Mar. 10, 2022

(30) Foreign Application Priority Data

Jan. 18, 2019 (JP) ................................ 2019-007086
May 30, 2019 (JP) ................................ 2019-101625

(51) Int. Cl.
*B43K 24/04* (2006.01)
*B43K 24/08* (2006.01)
*B43K 25/02* (2006.01)

(52) U.S. Cl.
CPC ............ *B43K 24/04* (2013.01); *B43K 24/082* (2013.01); *B43K 24/084* (2013.01); *B43K 25/028* (2013.01)

(58) Field of Classification Search
CPC .... B43K 25/02; B43K 25/022; B43K 25/024; B43K 25/026; B43K 25/028
See application file for complete search history.

(56) References Cited

U.S. PATENT DOCUMENTS 1,462,591 A * 7/1923 Andersen ............ B43K 25/022 24/11 M
5,336,006 A * 8/1994 Badr .................... B43K 25/028 401/105

(Continued)

FOREIGN PATENT DOCUMENTS

DE 20213245 U1 * 2/2004 ............ B43K 25/02
JP S57179986 U 11/1982

(Continued)

*Primary Examiner* — David P Angwin
*Assistant Examiner* — Bradley S Oliver
(74) *Attorney, Agent, or Firm* — The Webb Law Firm

(57) ABSTRACT

A clip body includes one upper wall extending in a longitudinal direction of a barrel and a pair of side walls formed at least on a front side of the upper wall, projecting from both side portions of the upper wall in a direction of a surface of the barrel, and having inner surfaces facing each other, a holding portion is provided on a back side of the clip body and between the pair of side walls, has a shape capable of producing an elastic force by deformation, and projects more in the direction of the surface of the barrel than the pair of side walls, the surface of the barrel includes a guide groove extending in the longitudinal direction of the barrel and provided with a bottom surface contacting the holding portion and a pair of side surfaces to restrict lateral movement of the holding portion, and a clip base is connected to a rear side of the clip body and supports the clip body at a height not to cause the pair of side walls to contact the surface of the barrel and the holding portion to contact the bottom surface of the guide groove.

12 Claims, 21 Drawing Sheets

(56) References Cited

U.S. PATENT DOCUMENTS

| | | | | |
|---|---|---|---|---|
| 6,773,185 | B1 | 8/2004 | Hsieh | |
| 9,108,456 | B2 * | 8/2015 | Ito | B43K 24/04 |
| 9,662,927 | B2 * | 5/2017 | Rolion | B43K 25/024 |
| 10,493,791 | B2 | 12/2019 | Ito | |

FOREIGN PATENT DOCUMENTS

| | | | |
|---|---|---|---|
| JP | 20126315 | A | 1/2012 |
| JP | 201697682 | A | 5/2016 |
| JP | 2016107518 | A | 6/2016 |
| JP | 201724224 | A | 2/2017 |
| KR | 2020090006428 | U | 6/2009 |
| KR | 1020150072336 | A | 6/2015 |
| WO | 2011096357 | A1 | 8/2011 |

* cited by examiner 41b
41b
41a
41
41b
41
42
42c
AM1
41c
41c
41b
41b
41
W1
42d
42c
42b
42a
W3

RETRACTABLE WRITING INSTRUMENT

CROSS-REFERENCE TO RELATED APPLICATIONS

This application is the United States national phase of International Application No. PCT/JP2020/000396 filed Jan. 9, 2020, and claims priority to Japanese Patent Application Nos. 2019-007086 filed Jan. 18, 2019 and 2019-101625 filed May 30, 2019, the disclosures of which are hereby incorporated by reference in their entirety.

BACKGROUND OF THE INVENTION

Field of the Invention

The present invention relates to a retractable writing instrument configured to a pen point to be in a state of projecting from a barrel or to be in a state of being retracted into the barrel by sliding a clip in a longitudinal direction of the barrel.

Description of Related Art

Conventionally, retractable writing instruments have been known. A general retractable writing instrument includes a columnar operating portion at the rear end of a barrel. The pen point of the retractable writing instrument is in a state of projecting from the barrel or in a state of being retracted into the barrel by pressing the columnar operating portion forward. For example, WO 2011/096357 discloses a retractable writing instrument as a special embodiment that is configured to cause a pen point to be in a state of projecting from a barrel or in a state of being retracted into the barrel by sliding a clip in a longitudinal direction of the barrel.

The clip is configured to have a clip body, a ball portion, and a base portion integrally molded with a synthetic resin. The clip body extends in the longitudinal direction of the barrel. The ball portion is located on a front side of a back surface of the clip body to be fit into a guide groove provided on the surface of the barrel. The base portion is located on a rear side of the back surface of the clip body and connected to a retractable mechanism provided in the barrel.

When a thin object, such as paper and cloth, is sandwiched between the clip and the barrel, the clip body made of a synthetic resin is elastically deformed using the base portion as a fulcrum. An elastic force produced by the deformed clip body causes the thin object to be held between the ball portion and the guide groove.

JP 2017-024224 A discloses a retractable writing instrument as a more special embodiment that has an elastically deformable cantilever integrally molded with a front side of a clip made of a synthetic resin. When a thin object is sandwiched between the clip and a barrel, the cantilever with low flexural rigidity is elastically deformed to hold the thin object.

PRIOR ART DOCUMENTS

Patent Document

Patent Document 1: WO 2011/096357
Patent Document 2: JP 2017-024224 A

SUMMARY OF THE INVENTION

Problems to be Solved by the Invention

In a retractable writing instrument in the past, a clip to retract and project a pen point is generally formed with a synthetic resin. This is because the clip made of a synthetic resin facilitates adjustment of an elastic force to hold objects. This is also because the clip made of a synthetic resin allows the ball portion to have a smooth curved surface and thus does not break the held object and does not damage the surface of the barrel. In contrast, a clip made of metal used to cause difficulty in adjustment of the elastic force and have the problems of breaking the held object and damaging the surface of the barrel.

That is, the clip of the writing instrument produces an elastic force by deforming the entire clip extending in the longitudinal direction of the barrel. The clip made of a synthetic resin allows free design of the entire shape to produce an optimal elastic force. It is also possible to design the ball portion, in an arbitrary shape, that is integrally molded with the clip made of a synthetic resin.

Meanwhile, the metal clip is configured with a plurality of walls, such as an upper wall extending in the longitudinal direction of the barrel and a pair of side walls continued to both sides of the upper wall. The plurality of walls are formed by bending one thin metal plate.

The pair of side walls of the metal clip are vertically bent from both sides of the upper wall. Such a pair of side walls act to block deformation of the entire clip by resisting a force applied to the metal clip. It is thus difficult to produce a desired elastic force in the metal clip itself.

In particular, the pair of side walls of the metal clip each has an edge facing the surface of the barrel. The edges of the pair of side walls contact an object held by the metal clip. Not to break thin paper, cloth, and the like by the edges of the pair of side walls, the elastic force of the metal clip has to be adjusted optimally.

In addition, contact of the surface of the barrel by the edges of the pair of side walls during sliding of the metal clip in the longitudinal direction of the barrel causes damage on the surface of the barrel. In particular, when a transfer film for decoration is adhered to the surface of the barrel, the transfer film is readily scraped off by the contact with the edges of the pair of side walls.

As a mechanism not to cause the edges of the pair of side walls to contact the surface of the barrel, it is considered to provide a projection to support the metal clip at a certain height on the surface of the barrel. However, such a projection causes difficulty in adhesion of a transfer film to the surface of the barrel.

Moreover, in the retractable writing instrument in the past, the clip to retract and project the pen point is connected to the retractable mechanism provided in the barrel. The retractable mechanism is configured with components to rotate in the circumferential direction of the barrel and components to move in the longitudinal direction of the barrel and is provided with clearance for movement of these components. Such clearance used to cause a problem of a rattle of the clip in the circumferential or longitudinal direction of the barrel.

The present invention has been made in view of the above problems, and it is an object thereof to provide a retractable writing instrument including a clip made of metal capable of solving the following technical issues:

- allowing adequate adjustment of an elastic force not to break thin paper, cloth, and the like;
- not damaging the surface of the barrel by the edges of the metal plate;
- not interfering with adhesion of a transfer film to the surface of the barrel;
- allowing inhibition of a rattle of the clip; and allowing smooth automatic assembly of the retractable writing instrument.

Means to Solve the Problems (1) To achieve the above object, a retractable writing instrument of the present invention, includes a pen point, a clip, and a barrel, the pen point being configured to be in a state of projecting from the barrel or a state of being retracted into the barrel by sliding the clip in a longitudinal direction of the barrel, wherein the clip includes a clip body, a holding portion, and a clip base, the clip body includes one upper wall extending in the longitudinal direction of the barrel and a pair of side walls formed at least on a front side of the upper wall, projecting from both side portions of the upper wall in a direction of a surface of the barrel, and having inner surfaces facing each other, the holding portion is provided on a back side of the clip body and between the pair of side walls, has a shape capable of producing an elastic force by deformation, and projects more in the direction of the surface of the barrel than the pair of side walls, the surface of the barrel includes a guide groove extending in the longitudinal direction of the barrel and provided with a pair of side surfaces to restrict lateral movement of the holding portion, and the clip base is connected to a rear side of the clip body and supports the clip body at a height not to cause the pair of side walls to contact the surface of the barrel.

(2) It is preferred that, in the retractable writing instrument of (1) above, the holding portion is made with an elastically deformable plate member extending in the longitudinal direction of the barrel, includes a fixed end located at a front end of the holding portion, a beam extending rearward from the fixed end, and a projecting portion bent from the beam in the direction of the surface of the barrel, and has a width to fit at least the projecting portion between the pair of side surfaces of the guide groove.

(3) It is preferred that, in the retractable writing instrument of (2) above, the holding portion has a free end at a rear end, the beam is configured to make first elastic deformation using the fixed end as a fulcrum, and the projecting portion is configured to make second elastic deformation after the free end contacts a back surface of the clip body.

(4) It is preferred that, in the retractable writing instrument of (3) above, a rear end portion including the free end of the holding portion has a width of ½ or more distance between the pair of side walls of the clip body.

(5) It is preferred that, in the retractable writing instrument of any one of (1) through (4) above, the upper wall of the clip body has a shape with an increasing width from the front side to a rear side, the pair of side walls of the clip body are formed from a front end to a rear end of the upper wall, on a rear side of the pair of side walls, a pair of engagement portions are formed projecting inside the clip body, at a front end of the pair of engagement portions, a pair of stopper walls are formed projecting toward a back surface of the upper wall, and the pair of engagement portions engage with both sides of the clip base and the pair of stopper walls abut on a front surface of the clip base.

(6) It is preferred that, in the retractable writing instrument of any one of (1) through (5) above, the clip body is configured by bending one metal plate.

(7) It is preferred that, in the retractable writing instrument of any one of (1) through (5) above, the clip body and the holding portion are configured by bending one metal plate.

(8) It is preferred that, in the retractable writing instrument of any one of (1) through (7) above, the guide groove includes a first region to longitudinally guide the holding portion during sliding of the clip, and a bottom surface is formed at least in a front half portion of the first region, and the clip base supports the clip body at a height to cause the holding portion to contact the bottom surface of the guide groove.

(9) It is preferred that, in the retractable writing instrument of (8) above, the guide groove includes a second region continued to a rear of the first region, and the bottom surface is formed across an entire area from the first region to the second region.

(10) It is preferred that, in the retractable writing instrument of (9) above, on a rear side of the barrel, a slide hole is provided to cause the clip base to slide in the longitudinal direction of the barrel, and the second region of the guide groove is in communication with a front end of the slide hole.

(11) It is preferred that, in the retractable writing instrument of any one of (1) through (7) above, the guide groove includes a first region to longitudinally guide the holding portion during sliding of the clip, and a through groove is formed at least in a rear half portion of the first region, and the clip base supports the clip body at a height to cause the holding portion to fit into the through groove of the guide groove.

(12) It is preferred that, in the retractable writing instrument of (11) above, the guide groove includes a second region continued to a rear of the first region, and the through groove is formed across an entire area from the first region to the second region.

(13) It is preferred that, in the retractable writing instrument of (12) above, on a rear side of the barrel, a slide hole is provided to cause the clip base to slide in the longitudinal direction of the barrel, and the second region of the guide groove is in communication with a front end of the slide hole.

In the retractable writing instrument of the present invention, the term "front" is defined as the direction of a pen point and the term "rear" is defined as the direction opposite to the pen point.

Effects of the Invention

The clip made of metal included in the retractable writing instrument of the present invention is capable of solving the following technical issues:

- allowing adequate adjustment of an elastic force not to break thin paper, cloth, and the like;
- not damaging the surface of the barrel by the edges of the metal plate;
- not interfering with adhesion of a transfer film to the surface of the barrel;
- allowing inhibition of a rattle of the clip; and
- allowing smooth automatic assembly of the retractable writing instrument.

BRIEF DESCRIPTION OF THE DRAWINGS

FIG. 1A is a side view and FIG. 1B is a cross-sectional view.

FIG. 2A is a side view and FIG. 2B is a cross-sectional view.

FIG. 3A is a perspective view of the clip body taken from above. FIG. 3B is a perspective view of the clip body taken from below.

FIG. 4A is a plan view, FIG. 4B is a side view, and FIG. 4C is a bottom view.

FIG. 5A is a front view, FIG. 5B is a side view, FIG. 5C is a plan view, FIG. 5D is a bottom view, FIG. 5E is a rear view, FIG. 5F is a cross-sectional view taken along line A-A in FIG. 5B, and FIG. 5G is a cross-sectional view taken along line B-B in FIG. 5B.

FIG. 6A is a cross-sectional side view of a rear side portion of the retractable writing instrument including the clip body, FIG. 6B is a side view of the clip body, and FIG. 6C is a cross-sectional view of the clip body.

FIG. 7A is a perspective view of a rear side portion of the intermediate barrel, and FIG. 7B is a cross-sectional view of the process of assembling the clip to the intermediate barrel.

FIG. 8A is a cross-sectional view, FIG. 8B is a bottom view, and FIG. 8C is a perspective view of the clip body taken from below.

FIG. 9A is a cross-sectional view, FIG. 9B is a bottom view, and FIG. 9C is a perspective view of the two clip bodies taken from below.

FIG. 10A is a cross-sectional view, FIG. 10B is a bottom view, and FIG. 10C is a perspective view of the two clip bodies taken from below.

FIG. 11A is a cross-sectional view illustrating a first example of the state of unintended connection and FIG. 11B is a perspective view illustrating a second example of the state of unintended connection.

FIG. 14A is a perspective view of the rear side portion of the intermediate barrel. FIG. 14B is a plan view of the rear side portion of the intermediate barrel.

FIG. 15A is a cross-sectional view illustrating a projected state of the pen point. FIG. 15B is a cross-sectional view illustrating a retracted state of the pen point.

FIG. 16A is a perspective view of a rear side portion of the intermediate barrel. FIG. 16B is a plan view of the rear side portion of the intermediate barrel. FIG. 16C is a cross-sectional view of the process of assembling a clip to the intermediate barrel.

FIG. 17A is a cross-sectional view illustrating a projected state of a pen point. FIG. 17B is a cross-sectional view illustrating a retracted state of the pen point.

FIG. 19A is a perspective view of a rear side portion of the intermediate barrel. FIG. 19B is a plan view of the rear side portion of the intermediate barrel. FIG. 19C is a cross-sectional view of the process of assembling a clip to the intermediate barrel.

FIG. 20A is a cross-sectional view illustrating a projected state of a pen point. FIG. 20B is a cross-sectional view illustrating a retracted state of the pen point.

DESCRIPTION OF THE INVENTION

1. First Embodiment

Figure 1A:
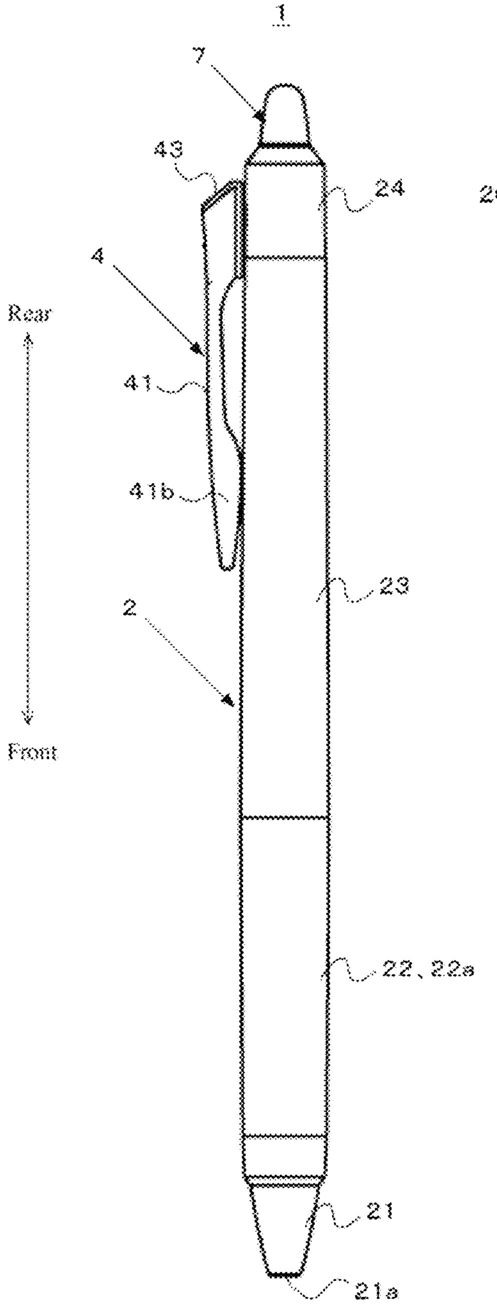
FIGS. 1A and 1B illustrate a retractable writing instrument according to a first embodiment of the present invention in a state of a pen point being retracted into a barrel.

With reference to FIGS. 1A through 9C, a retractable writing instrument according to the first embodiment of the present invention is described below. In the embodiments described below, the retractable writing instrument is exemplified by a thermochromic writing instrument that allow handwriting in thermochromic ink to be thermochromic by frictional heat. However, the configuration of the present invention is not limited to a thermochromic writing instrument and is widely applicable to general retractable writing instruments.

1.1 Retractable Writing Instrument

The configuration of a retractable writing instrument 1 according to the first embodiment of the present invention is illustrated in FIGS. 1A, 1B, 2A, and 2B. Double-pointed arrows in these drawings define the “front” and the “rear” of the retractable writing instrument 1. The retractable writing instrument 1 includes a barrel 2, a rotary member 3, a clip 4, a spring 5, a writing tool body 6, and a friction unit 7.

At first, the external configuration of the retractable writing instrument 1 is described. As illustrated in FIG. 1A, the barrel 2 is configured with a tip 21, a front barrel 22, an intermediate barrel 23, and a rear barrel 24. The front barrel

22 has an outer peripheral surface on which an elastic grip 22*a* is mounted. The rear barrel 24 has an attachment hole 24*b* (refer to FIG. 6A) to fit a friction body 7. Meanwhile, the clip 4 is configured with a clip body 41 and a clip base 43. Among the components configuring the appearance of the retractable writing instrument 1, the tip 21 and the clip body 41 are formed by metal and the other components are formed by a synthetic resin. In the design of the entire retractable writing instrument 1, the tip 21 and the clip body 41 made of metal markedly differ in the texture and the appearance from the barrel 2 made of a synthetic resin and thus are eye-catching features to users. A surface of the barrel 2 made of a synthetic resin, for example, a surface of the intermediate barrel 23 is decorated by adhering a transfer film.

Figure 1B:
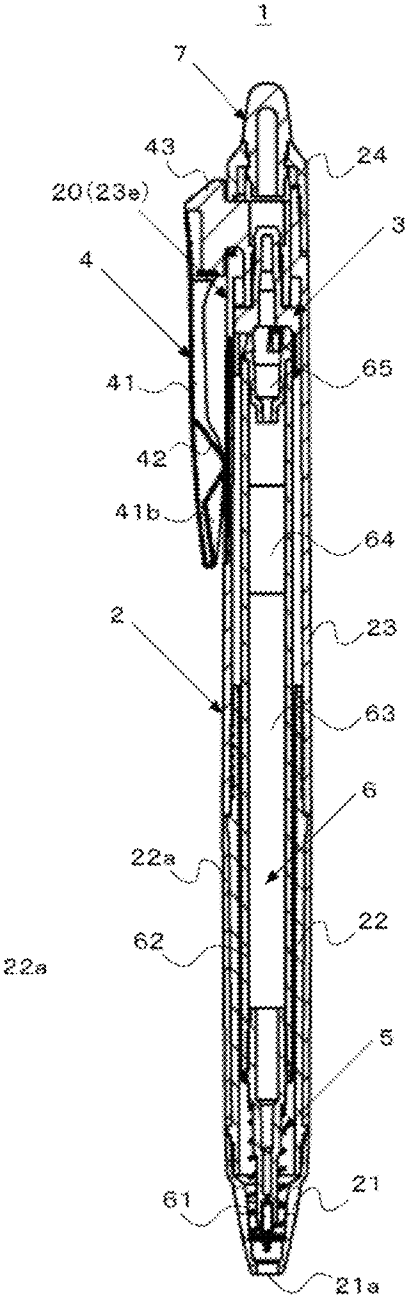

The internal configuration of the retractable writing instrument 1 is then described. As illustrated in FIG. 1B, the barrel 2 houses, in order from the front, the spring 5, the writing tool body 6, the rotary member 3, and a cylindrical portion 43*d* (refer to FIG. 6A) of the clip base 43.

The writing tool body 6 includes a pen point 61, an ink storage tube 62, thermochromic ink 63, a follower 64, and an end plug 65. The pen point 61 is attached to a front end of the ink storage tube 62. The pen point 61 in the present embodiment is a ball-point pen tip while the configuration of the present invention is not limited to a ball-point pen and is widely applicable to retractable writing instruments, such as mechanical pencils and markers. The thermochromic ink 63 and the follower 64 are filled in the ink storage tube 62. The end plug 65 is mounted in an opening at a rear end of the ink storage tube 62. The end plug 65 is provided with a longitudinally extending air vent at the center. The thermochromic ink 63 forms handwriting on a paper surface and the friction unit 7 allows the handwriting to be thermochromic. The friction unit 7 produces frictional heat by abrasion on a paper surface. The frictional heat causes the handwriting in the thermochromic ink 63 to be thermochromic. The thermochromic ink 63 changes its color by heating, for example, from a first color to a second color or from being colored to being colorless.

A retractable mechanism causes the pen point 61 of the writing tool body 6 to be in a state of projecting from the barrel 2 or a state of being retracted into the barrel 2. The retractable mechanism is configured with the spring 5, the rotary member 3, and the clip base 43 housed in the barrel 2 and a slide hole 20, a cam gear 23*a*, and a cam groove 23*b* provided on a wall of the barrel 2 (refer to FIG. 6A).

As illustrated in FIG. 1B, the spring 5 is mounted in a front end portion of the writing tool body 6 and constantly biases the writing tool body 6 rearward. Rearward of the writing tool body 6, the rotary member 3 and the clip base 43 are arranged.

Figure 6A:
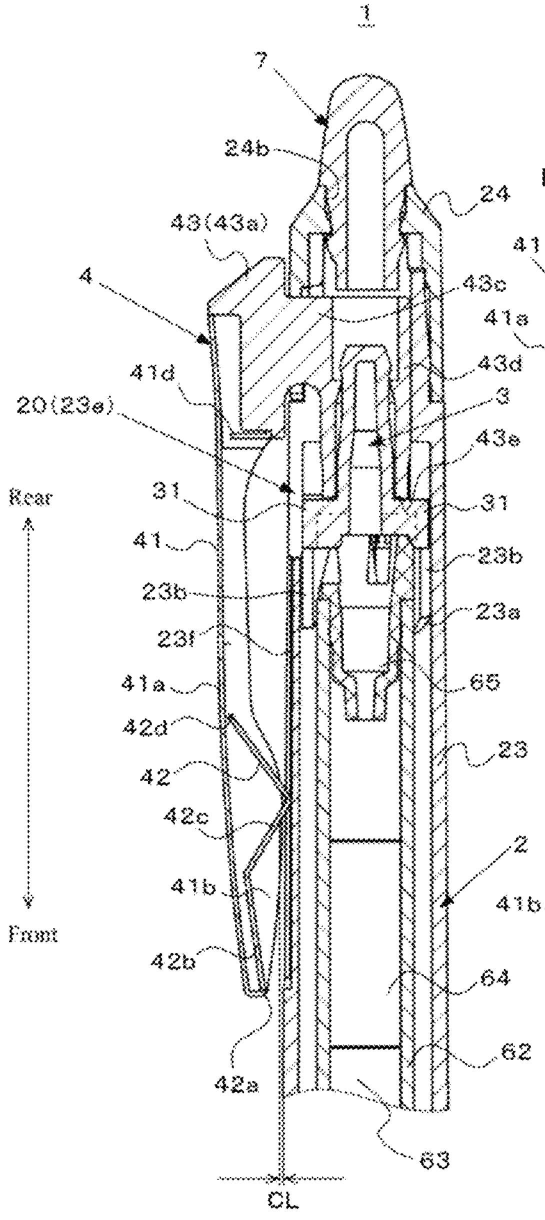
FIGS. 6A, 6B, and 6C illustrate a state of the clip body after assembled to the retractable writing instrument.
Figure 6B:
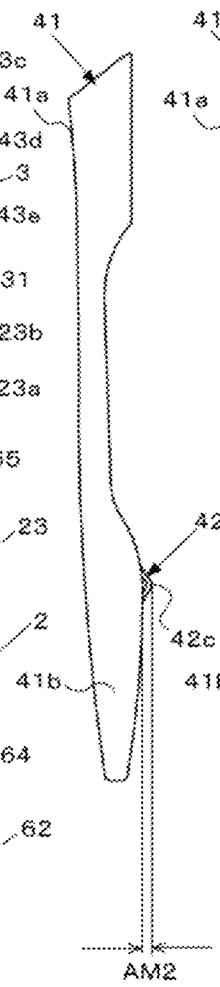

As illustrated in FIG. 6A, the rotary member 3 is rotatably connected to the cylindrical portion 43*d* of the clip base 43. The rotary member 3 include four convex threads 31. The four convex threads 31 are evenly provided on an outer surface of the rotary member 3 at intervals of 90°. The convex threads 31 continue from a side surface to an upper surface of the rotary member 3. Rear end portions of the convex threads 31 projecting from the upper surface of the rotary member 3 form inclined surfaces (cam gear) inclined in one direction.

The clip base 43 is longitudinally slidable along the slide hole 20 provided on a rear side of the barrel 2. The clip base 43 is provided with a slider 43*a*, a coupling portion 43*c*, and the cylindrical portion 43*d* (refer to FIG. 5B). The slider 43*a* is located outside the barrel 2. The cylindrical portion 43*d* is located inside the barrel 2. The slider 43*a* is connected to a rear side of the clip body 41. The coupling portion 43*c* couples the slider 43*a* and the cylindrical portion 43*d* via the slide hole 20 of the barrel 2. The cylindrical portion 43*d* is provided with a cam gear 43*e* at a front end (refer to FIG. 5B). The cam gear 43*e* of the cylindrical portion 43*d* engages with the rear end portions of the convex threads 31 of the rotary member 3.

The barrel 2 has an inner wall surface provided with the cam gear 23*a* and the cam groove 23*b* described above. The cam gear 23*a* and the cam groove 23*b* alternately engage with the convex threads 31 of the rotary member 3. This causes the pen point 61 of the writing tool body 6 to be in a projecting state or a retracted state. That is, a user of the retractable writing instrument 1 slides the slider 43*a* of the clip base 43 together with the clip body 41 forward along the slide hole 20 of the barrel 2. Then, in the barrel 2, the rotary member 3 is pushed by the cylindrical portion 43*d* of the clip base 43 and moves forward more than the cam gear 23*a* and the cam groove 23*b*. In this situation, the rotary member 3 rotates in one direction and the convex threads 31 engage with either one of the cam gear 23*a* or the cam groove 23*b*. The engagement of the convex threads 31 with the cam gear 23*a* causes the rotary member 3 having moved forward to be retained. As a result, the pen point 61 of the writing tool body 6 is in a state of projecting from a front end hole 21*a* of the barrel 2. In contrast, engagement of the convex threads 31 with the cam groove 23*b* causes rearward movement of the rotary member 3 along the cam groove 23*b*. As a result, the pen point 61 of the writing tool body 6 is in a state of being retracted into the barrel 2.

1.2 Clip

The retractable writing instrument 1 in the present embodiment is characterized in the configuration of the clip 4. The configuration of the clip 4 is described below in detail. The clip 4 in the present embodiment is made with the clip body 41 and the clip base 43 illustrated in FIG. 6A. The clip body 41 has a front end provided integrally with a holding portion 42. The holding portion 42 produces an elastic force to hold an object.

Figure 3A:
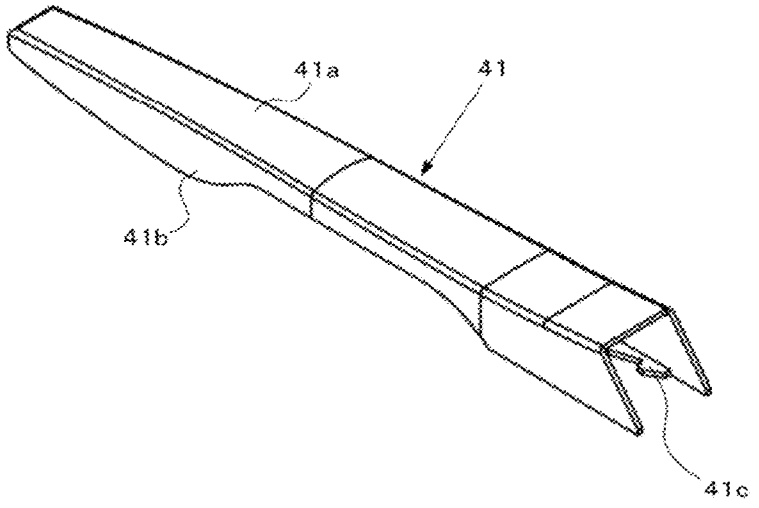
FIGS. 3A and 3B illustrate a clip body configuring a clip of the retractable writing instrument.
Figure 3B:
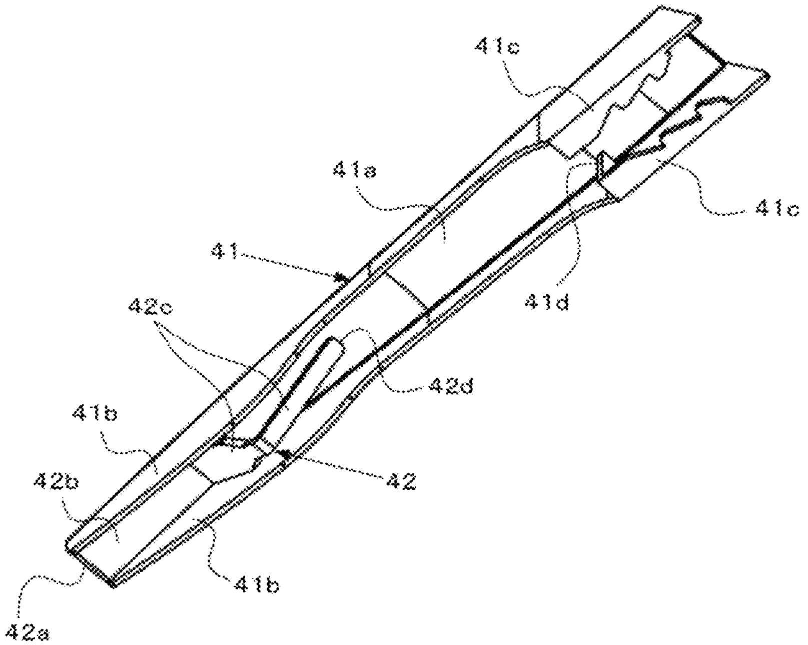
Figures 4A, 4B, 4C:
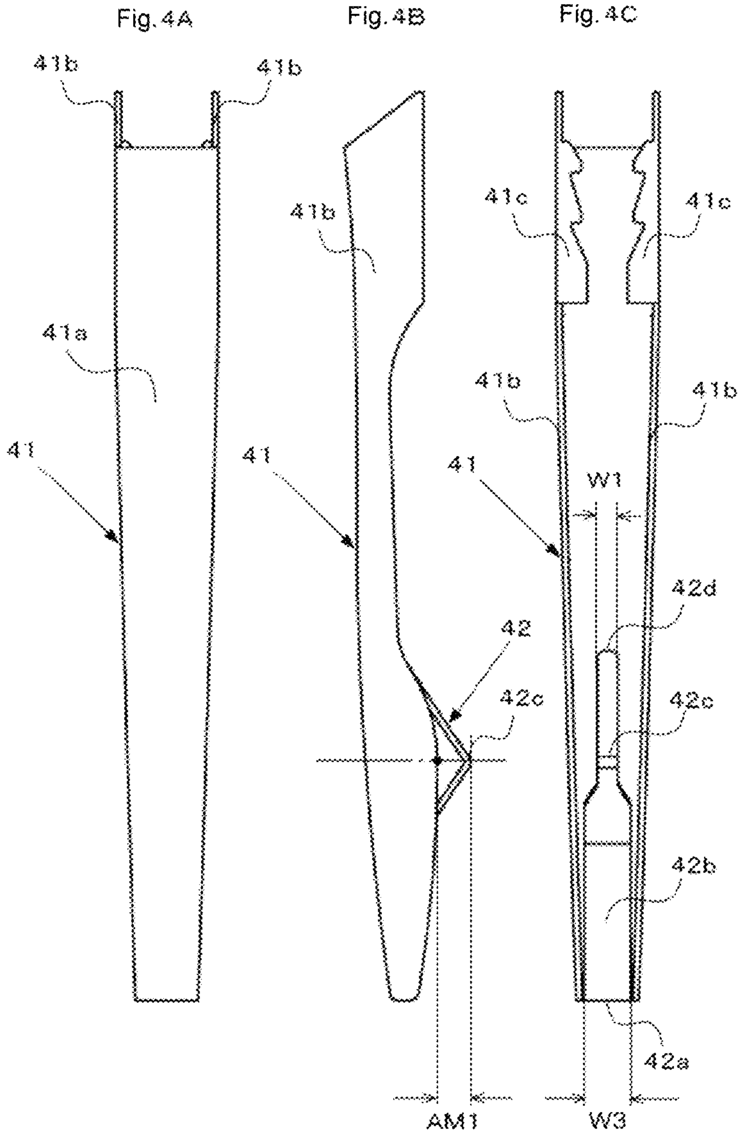
FIGS. 4A, 4B, and 4C illustrate a state of the clip body before assembled to the retractable writing instrument.

FIGS. 3A and 3B and FIGS. 4A through 4C illustrate the configuration of the clip body 41 and the holding portion 42 in the present embodiment. The clip body 41 and the holding portion 42 are integrally configured by bending one metal plate. A fixed end 42*a* illustrated in FIGS. 3B and 4C is a boundary between the clip body 41 and the holding portion 42. The clip body 41 forms a main appearance of the clip 4 with the fixed end 42*a* as the boundary. Meanwhile, the holding portion 42 produces an elastic force to hold an object using the fixed end 42*a* as a fulcrum.

1.2.1 Clip Body

The clip body 41 is provided with one upper wall 41*a* and a pair of side walls 41*b*. The upper wall 41*a* extends in a longitudinal direction of the barrel 2. The pair of side walls 41*b* are formed by bending the metal plate continued to both sides of the upper wall 41*a* respectively in a vertical direction. The pair of side walls 41*b* reach a rear end from a front end of the upper wall 41*a* and extends further rearward. Edges of the metal plate forming such a pair of side walls 41*b* face the surface of the barrel 2, that is, a transfer film adhered to a surface of the intermediate barrel 23.

In this situation, the clip 4 in the present embodiment is configured to hold an object with a thickness of a clearance CL or less in FIG. 6A using the holding portion 42 and to hold an object with a thickness of more than the clearance CL using the clip body 41. The holding portion 42 flexibly deforms to produce an elastic force and the elastic force causes the object with a thickness of the clearance CL or less to be held. Meanwhile, the clip body 41 has a box shape surrounded by the walls of the metal plate and is highly rigid. Such a clip body 41 sandwiches the object with a thickness of more than the clearance CL by slightly deflecting the entire clip body 41. It is thus possible to design an external shape of the clip body 41 almost without considering the elastic force to hold objects. That is, the clip body 41 in the present embodiment has a high degree of freedom of external shape design.

As illustrated in FIG. 4A, the upper wall 41*a* has the narrowest width at the front end and the width gradually increases from the front side to the rear side. Further, as illustrated in FIG. 4B, the upper wall 41*a* is gently curved from the front end to the rear end. Meanwhile, as illustrated in FIG. 4B, the side walls 41*b* have front sides designed in the shape of a gently curved ball portion. The center of the side walls 41*b* has a lower wall height than the other areas and gives an impression as if the center of the clip body 41 is flexibly bent. The side walls 41*b* have rear sides designed approximately in a parallelogram made with straight lines in contrast to the front side made with curved lines.

Figure 5F:
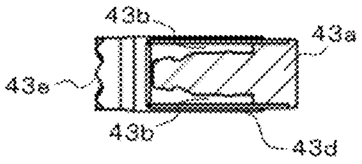
FIGS. 5A through 5G illustrate a clip base configuring the clip of the retractable writing instrument.
Figure 5C:
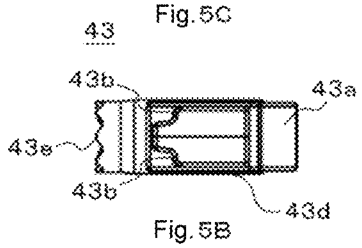
Figure 5A:
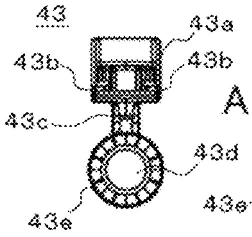
Figure 5B:
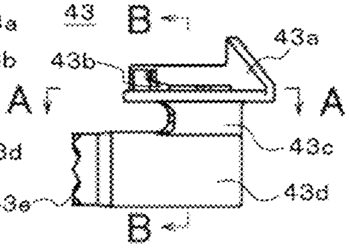
Figure 5E:
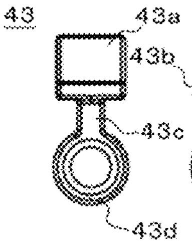
Figure 5G:
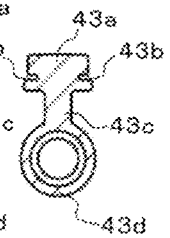
Figure 5D:
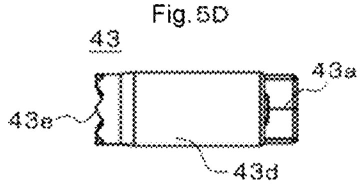

As illustrated in FIGS. 3B and 4C, on the rear sides of the pair of side walls 41*b*, a pair of engagement portions 41*c* projecting inside the clip body 41 are formed. Further, as illustrated in FIG. 3B, at front ends of the pair of engagement portions 41*c*, a pair of stopper walls 41*d* projecting toward a back surface of the upper wall 41*a* are formed. Meanwhile, as illustrated in FIGS. 5B and 5F, on both sides of the slider 43*a* of the clip base 43, a pair of engagement grooves 43*b* are provided. As illustrated in FIG. 6A, the pair of engagement portions 41*c* of the clip body 41 engage with the pair of engagement grooves 43*b* of the slider 43*a*. In this situation, the pair of stopper walls 41*d* abut on the front surface of the slider 43*a*.

1.2.2 Holding Portion

As illustrated in FIG. 3B, the holding portion 42 is provided on a back side of the clip body 41 and between the pair of side walls 41*b*. In more detail, the holding portion 42 is located between front side areas designed in the shape of the ball portion in the pair of side walls 41*b*. The holding portion 42 is configured by bending part of the metal plate same as the clip body 41.

The holding portion 42 in the present embodiment includes a beam 42*b* and a projecting portion 42*c* continuing each other. The beam 42*b* horizontally extends rearward of the barrel 2 from the fixed end 42*a* (refer to FIG. 8A). The projecting portion 42*c* is bent in a V-shape from the beam 42*b* and projects in a direction of the surface of the barrel 2. The projecting portion 42*c* has an apex that is preferably located on a straight line through the highest part in each of the side walls 41*b* configuring the ball portion. In FIG. 4B, the black dot represents the highest part in each of the side walls 41*b*. Also, in FIG. 4B, the dash-dotted line represents the straight line passing through the highest part in each of the side walls 41*b*. The apex of the projecting portion 42*c* in the present embodiment is located on the dash-dotted line passing through the black dot in FIG. 4B. The projecting portion 42*c* has a rear end forming a free end 42*d*. Before the clip body 41 is assembled to the retractable writing instrument 1, the free end 42*d* of the projecting portion 42*c* does not contact the back surface of the upper wall 41*a* of the clip body 41 (refer to FIG. 8A).

Figure 7A:
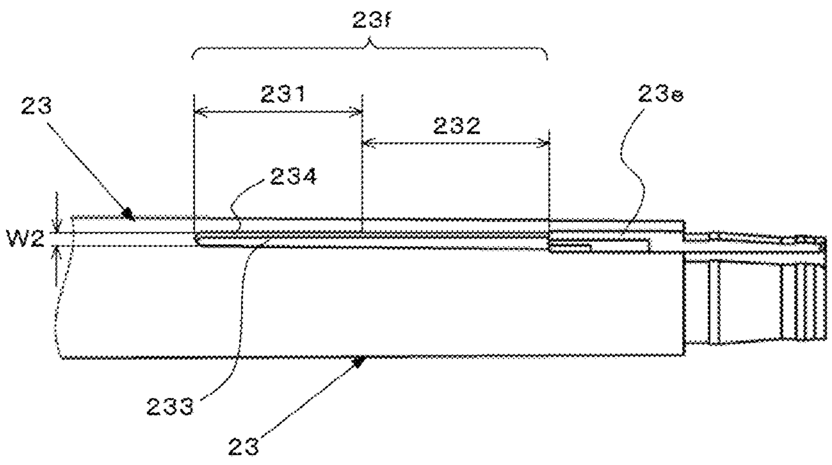
FIGS. 7A and 7B illustrate an intermediate barrel configuring the retractable writing instrument.

Further, the projecting portion 42*c* has a width W1 fit in a guide groove 23*f* of the barrel 2 illustrated in FIG. 7A. As illustrated in FIG. 4C, the width W1 from the front to the rear end of the V-shaped apex of the projecting portion 42*c* is narrower than a width W3 of the beam 42*b* ($W1<W3$). The width W1 of the projecting portion 42*c* is slightly narrower than a width W2 of the guide groove 23*f* of the barrel 2. The difference in the dimensions between the width W2 of the guide groove 23*f* and the width W1 of the projecting portion 42*c* is preferably in a range of $0.1\ mm \leq W2-W1 \leq 4.0\ mm$. The projecting portion 42*c* fits between a pair of side surfaces 234 of the guide groove 23*f* and moves in the longitudinal direction of the barrel 2 along the guide groove 23*f*. The projecting portion 42*c* does not contact an area other than the guide groove 23*f* of the barrel 2. To obtain sufficient strength, the width W1 of the projecting portion 42*c* is preferably more than 20% of the width W3 of the beam 42*b* ($W3\times0.2<W1$).

In this situation, the holding portion 42 in the present embodiment is configured to produce two-tier elastic forces in accordance with the thickness of the object to be held. The first-tier elastic force is produced by deformation of the beam 42*b* using the fixed end 42*a* as a fulcrum illustrated in FIG. 6C. As illustrated in FIG. 6A, when the clip body 41 is assembled to the retractable writing instrument 1, the beam 42*b* deforms in a direction of the back surface of the upper wall 41*a* of the clip body 41 using the fixed end 42*a* as a fulcrum. As reaction upon the deformation, the projecting portion 42*c* exerts the first-tier elastic force on the guide groove 23*f* of the barrel 2 (refer to amounts AM1 and AM2 of projection illustrated in FIGS. 4B and 6B). As a value of the first-tier elastic force, for example, the projecting portion 42*c* constantly applies a load of 200 gf to the guide groove 23*f* of the barrel 2.

Figure 6C:
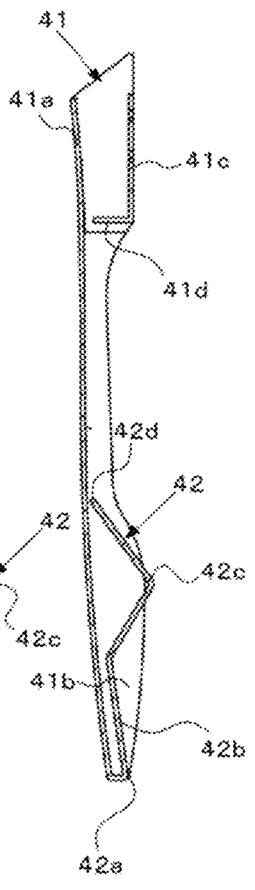

Then, the second-tier elastic force is produced by deformation of the projecting portion 42*c* illustrated in FIG. 6C using the apex as a fulcrum. That is, when the beam 42*b* is further deformed using the fixed end 42*a* as a fulcrum while the first-tier elastic force is produced, the free end 42*d* of the projecting portion 42*c* contacts the back surface of the upper wall 41*a* of the clip body 41. This causes the projecting portion 42*c* to be deformed using the apex as a fulcrum and to produce the second-tier elastic force.

The holding portion 42 in the present embodiment thus holds a thin object with the first-tier elastic force (e.g., 200 gf) and holds a thick object with the combined first-tier and second-tier elastic forces (e.g., more than 200 gf).

1.2.3 Clip Base

FIGS. 5A through 5G illustrate the configuration of the clip base 43. As already described, the clip base 43 is provided with the slider 43*a*, the coupling portion 43*c*, and the cylindrical portion 43*d*. The slider 43*a* is provided with the pair of engagement grooves 43*b*. The pair of engagement grooves 43*b* engage with the pair of engagement portions 41*c* of the clip body 41. At the front end of the cylindrical portion 43*d*, the cam gear 43*e* is provided. The cam gear 43*e* engages with the rear end portions of the convex threads 31 of the rotary member 3.

In this situation, as illustrated in FIG. 6A, the clip base 43 in the present embodiment supports the clip body 41 connected to the slider 43*a* at a predetermined height not to damage the surface of the barrel 2. That is, the clip base 43 supports the clip body 41 at a height to cause the pair of side walls 41*b* not to contact the surface of the barrel 2 and to cause the holding portion 42 to contact a bottom surface 233 of the guide groove 23*f*. This configuration causes the clearance CL illustrated in FIG. 6A to be maintained between the surface of the barrel 2 and the pair of side walls 41*b*. Firstly, the clearance CL is maintained by the height of supporting the clip body 41 by the clip base 43. Secondly, the clearance CL is maintained by the elastic force (e.g., 200 gf) of the holding portion 42 produced when the clip body 41 is assembled to the retractable writing instrument 1.

1.3 Guide Groove of Barrel

As illustrated in FIG. 7A, the guide groove 23*f* described above is provided on a rear side of the intermediate barrel 23 configuring the barrel 2. The guide groove 23*f* is a groove extending in the longitudinal direction of the barrel 2 and is configured with the bottom surface 233 and the pair of side surfaces 234. As illustrated in FIG. 6A, the bottom surface 233 of the guide groove 23*f* contacts the projecting portion 42*c* configuring the holding portion 42 of the clip 4. The pair of side surfaces 234 of the guide groove 23*f* restrict lateral movement of the projecting portion 42*c*. The guide groove 23*f* thus configured guides the clip 4 being slid to retract and project the pen point 61 to the longitudinal direction of the barrel 2 and moves the clip 4 straight. As already described, the surface of the intermediate barrel 23 is decorated by adhering the transfer film while the transfer film is not adhered to the guide groove 23*f*.

In this situation, the guide groove 23*f* in the present embodiment has the total length more than a length for sliding of the clip 4. As illustrated in FIG. 7A, the guide groove 23*f* includes a first region 231 on the front side and a second region 232 on the rear side. The second region 232 is in communication with a front end of a first long hole 23*e* provided on the rear side of the intermediate barrel 23. The first long hole 23*e*, together with a second long hole 24*a* in the rear barrel 24 illustrated in FIG. 2B, configures the slide hole 20.

The first region 231 of the guide groove 23*f* is used for sliding the clip 4 to retract and project the pen point 61. That is, when the pen point 61 is retracted and projected, the clip 4 longitudinally moves in the range of a length of the first region 231.

Figure 7B:
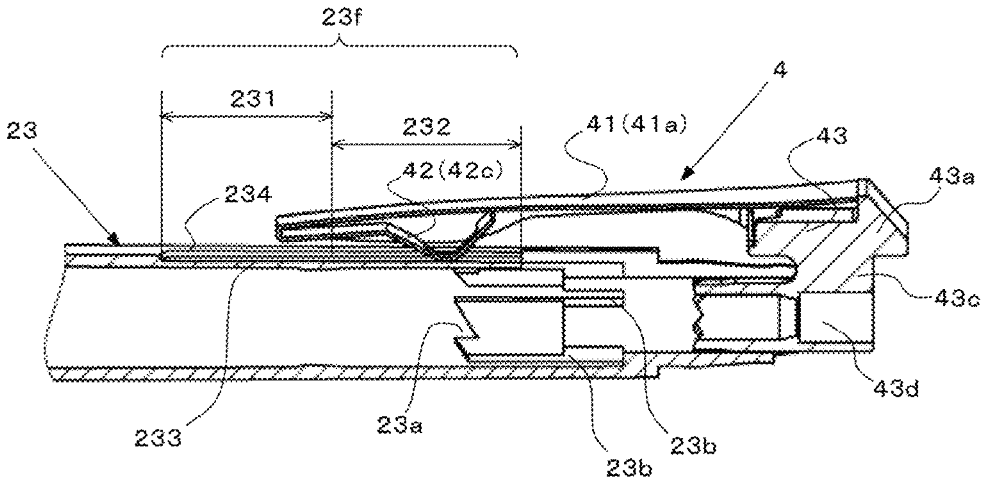

Meanwhile, the second region 232 of the guide groove 23*f* is used for assembling the clip 4 to the intermediate barrel 23. As illustrated in FIG. 7B, the clip 4 is assembled by front-end inserting the cylindrical portion 43*d* of the clip base 43 into the intermediate barrel 23. In the process of assembling the clip 4 to the intermediate barrel 23, the projecting portion 42*c* configuring the holding portion 42 of the clip 4 passes through the first long hole 23*e* and is guided from the second region 232 of the guide groove 23*f* to the first region 231. This allows the clip 4 to be assembled to the intermediate barrel 23 without causing the projecting portion 42*c* made of metal to contact the surface of the intermediate barrel 23.

1.4 Technical Effects of Clip

It is possible to configure the clip 4 in the present embodiment with a metal plate and also possible to adequately adjust the elastic force not to break thin paper, cloth, and the like. That is, the clip 4 made of metal is configured with the clip body 41 and the holding portion 42. The clip 4 has an appearance is formed by the external shape of the clip body 41 in a box shape surrounded by the plurality of walls. The elastic force of the clip 4 is produced by the holding portion 42 provided on the back side of the clip body 41. The configuration of the holding portion 42 does not affect the appearance of the clip 4. It is thus possible to freely configure the holding portion 42 to produce an adequate elastic force. Meanwhile, the external shape of the clip body 41 may be designed almost without considering the elastic force to hold an object and has a high degree of freedom of design.

The clip 4 in the present embodiment does not damage the surface of the barrel 2 by the edges of the metal plate. Firstly, the clearance CL illustrated in FIG. 6A is maintained between the clip body 41 made of metal and the surface of the barrel 2 to which the transfer film is adhered. This causes the pair of side walls 41*b* of the clip body 41 not to contact the surface of the barrel 2. Secondly, the holding portion 42 made of metal only contacts the guide groove 23*f* to which the transfer film is not adhered and does not contact the surface of the barrel 2 to which the transfer film is adhered. The configuration above does not cause the clip 4 made of metal to contact and damage the surface of the barrel 2.

The clip 4 in the present embodiment is capable of blocking contact of the clip 4 made of metal with the surface of the barrel 2 without providing a projection as in the past on the surface of the barrel 2. It is thus possible to efficiently adhere the transfer film to the surface of the barrel 2.

In the clip 4 in the present embodiment, the holding portion 42 constantly exerts an elastic force on the guide groove 23*f* of the barrel 2. The elastic force of the holding portion 42 constantly inhibits a rattle of the clip 4. This firstly improves the operability of the clip 4. That is, the clip 4 with no rattle is capable of being slid straight along the slide hole 20 and the guide groove 23*f*. Secondly, such a clip prevents uncomfortable sound and vibration due to a rattle of the clip 4. In particular, the clip 4 inhibits a rattle of the clip 4 during writing with the retractable writing instrument 1 for good feel during use of the retractable writing instrument 1.

Further, in the clip 4 in the present embodiment, the pair of stopper walls 41*d* provided in the single clip body 41 prevent unintended connection of the clip body 41 with another clip body 41. This allows smooth automatic assembly of the retractable writing instrument 1. The unintended connection between two clip bodies 41 is described in detail in the following second embodiment.

2. Second Embodiment

With reference to FIGS. 8A through 11B, a retractable writing instrument according to the second embodiment of the present invention is then described. In the second embodiment, prevention of unintended connection between two clip bodies during automatic assembly of the retractable writing instrument is described.

2.1 Stopper Walls and Wider Portion

Figure 8A:
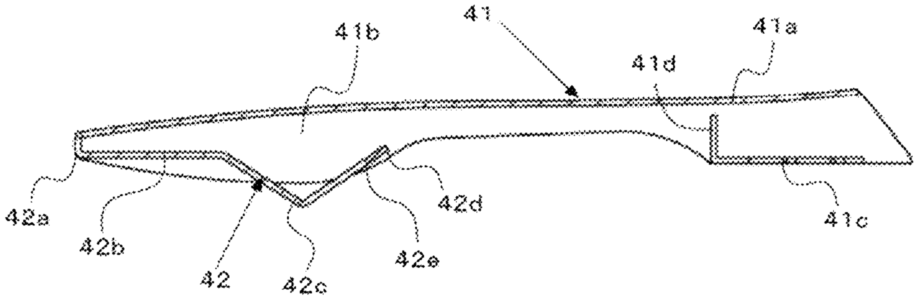
FIGS. 8A, 8B, and 8C illustrate a clip body configuring a clip of a retractable writing instrument according to a second embodiment of the present invention.
Figure 8B:
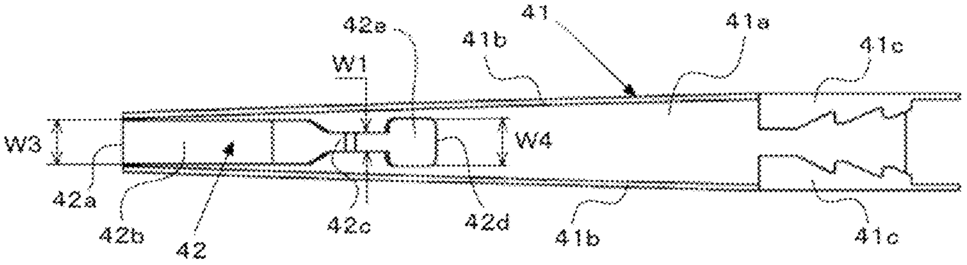
Figure 8C:
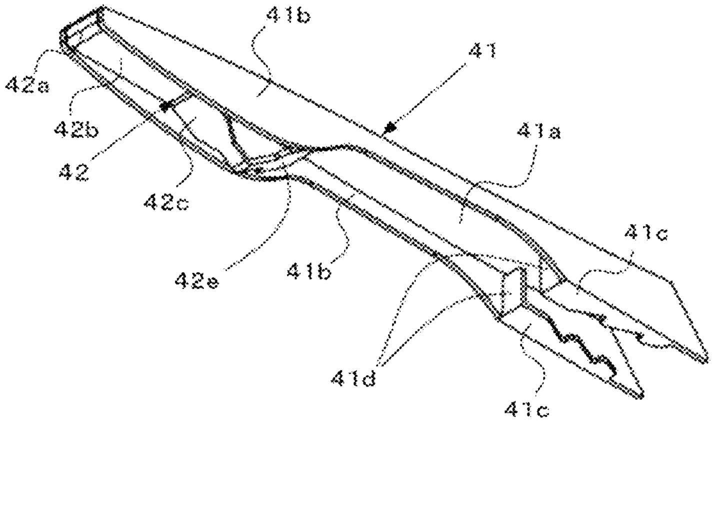

Unintended connection between the two clip bodies 41 is prevented by the pair of stopper walls 41*d* and one wider portion 42*e* illustrated in FIGS. 8A through 8C. The configuration of the pair of stopper walls 41*d* is already described in the first embodiment. The pair of stopper walls 41*d* are formed at the front ends of the pair of engagement portions 41*c* and project toward the back surface of the upper wall 41*a*. Meanwhile, the wider portion 42*e* is provided in a rear end portion including the free end 42*d* of the holding portion 42. As illustrated in FIG. 8B, the wider portion 42*e* has a width W4, which is at least wider than the width W1 of the projecting portion 42*c* and is preferably ½ or more distance between the pair of side walls 41*b* of the clip body 41. The width W4 of the wider portion 42*e* in the present embodiment has approximately the same dimensions as the width W3 and may be more than the width W3 of the beam 42*b* (W3 W4).

2.2 Technical Effects of Stopper Walls

Figure 9A:
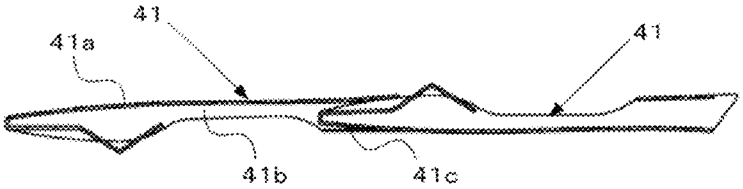
FIGS. 9A, 9B, and 9C illustrate a state of unintended connection between two clip bodies having no stopper wall.
Figure 9B:
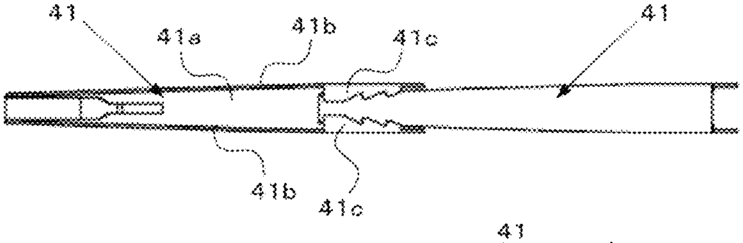
Figure 9C:
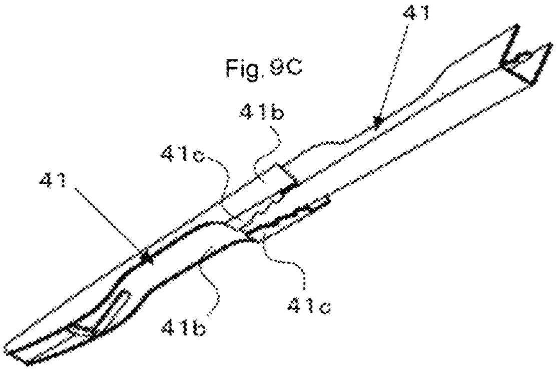

FIGS. 9A through 9C illustrate two clip bodies 41 provided with no stopper walls 41*d* and no wider portion 42*e*. The configuration of each clip body 41 is identical to that of the clip body 41 in the first embodiment illustrated in FIGS. 4A through 4C except for being provided with no stopper walls 41*d*.

As illustrated in FIG. 9B, each clip body 41 has an external shape in which the width at the front end is narrowest and the width gradually increases from the front side to the rear side. As illustrated in FIGS. 9A and 9C, an opening at a rear end of the clip body 41 is surrounded by the upper wall 41*a*, the pair of side walls 41*b*, and the pair of engagement portions 41*c*. Accordingly, the front side with a narrower width of one of the clip bodies 41 sometimes deeply fit into the rear side with a wider width of the other clip body 41. Automatic assembling machines are not capable of separating the two clip bodies 41 thus fit. The automatic assembly of the retractable writing instrument 1 is thus temporarily interrupted.

Figure 10A:
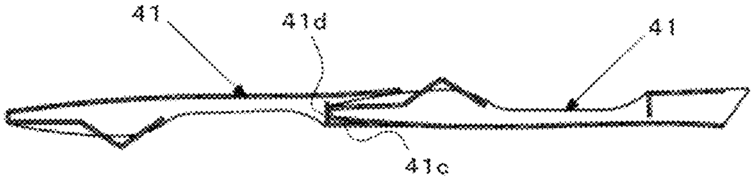
FIGS. 10A, 10B and 10C illustrate a state of blocking connection between two clip bodies having stopper walls.
Figure 10B:
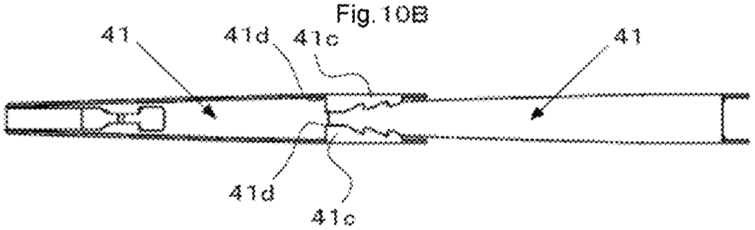
Figure 10C:
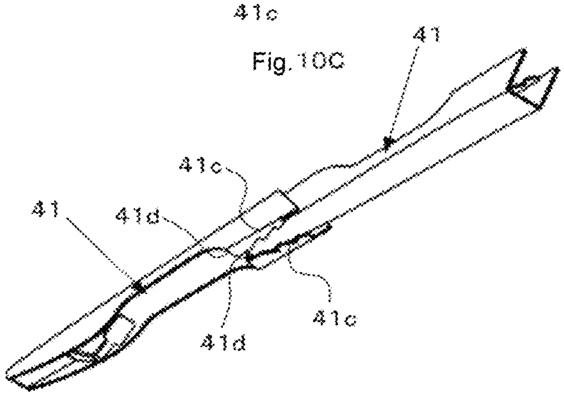

FIGS. 10A through 10C illustrate the two clip bodies 41 provided with the pair of stopper walls 41*d*. The pair of stopper walls 41*d* provided in one of the clip bodies 41 abut on the front end of the other clip body 41 to block fitting of the one clip body 41 to the other. Such a plurality of clip bodies 41 are thus supplied to an automatic assembling machine in a state of being separated one by one for smooth automatic assembly of the retractable writing instrument 1.

2.3 Technical Effects of Wider Portion

Figure 11A:
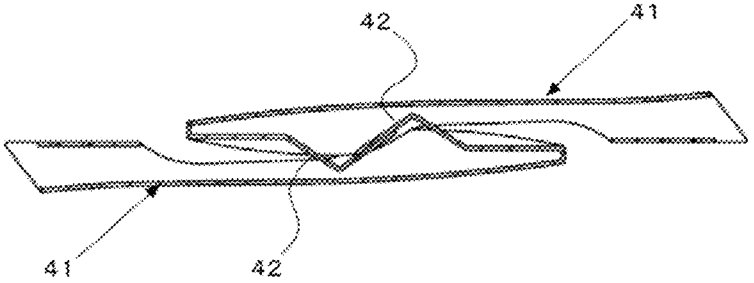
FIGS. 11A and 11B illustrate a state of unintended connection between two clip bodies having no wider portion in the holding portion.
Figure 11B:
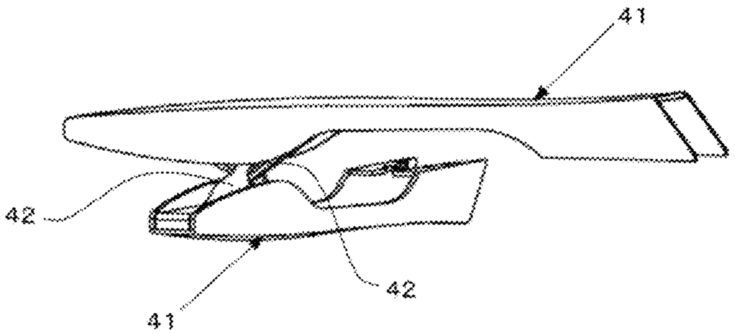

As illustrated in FIGS. 11A and 11B, two clip bodies 41 provided with no wider portion 42*e* are sometimes intertwined with each other in the holding portions 42. Automatic assembling machines are not capable of separating the two clip bodies 41 intertwined with each other in the holding portions 42. The automatic assembly of the retractable writing instrument 1 is thus temporarily interrupted.

The wider portion 42*e* illustrated in FIGS. 8A through 8C allows a decrease in intertwinement of the two clip bodies 41 with each other in the holding portions 42. That is, the wider portion 42*e* is ½ or more the distance between the pair of side walls 41*b* of the clip body 41. The wider portion 42*e* of one of the clip bodies 41 thus does not readily enter a gap in the holding portion 42 of the other clip body 41. As a result, the intertwinement of the holding portions 42 with each other decreases. According to such a wider portion 42*e*, such a plurality of clip bodies 41 are supplied to an automatic assembling machine in a state of being separated one by one for smooth automatic assembly of the retractable writing instrument 1.

As described above, the projecting portion 42*c* deforms using the apex as a fulcrum by contact of the free end 42*d* with the back surface of the upper wall 41*a* of the clip body 41 and produces the second-tier elastic force. The wider portion 42*e* inhibits a rattle of the projecting portion 42*c* and stabilizes the deformation of the projecting portion 42*c* for producing the second-tier elastic force.

The technical effects of the wider portion 42*e* described above are more marked cue to a wider width W4 of the wider portion 42*e*. That is, a wider width W4 of the wider portion 42*e* allows more secure prevention of the intertwinement of the two clip bodies 41 with each other in the holding portions 42. A wider width W4 of the wider portion 42*e* also allows a decrease in a rattle of the projecting portion 42*c* and stabilizes the deformation of the projecting portion 42*c* for producing the second-tier elastic force.

3. Other Embodiments of Holding Portion

The configuration of the holding portion 42 of the clip body 41 is not limited to the V-shape illustrated in FIGS. 4A through 4C. The holding portion 42 may be configured as illustrated in, for example, FIGS. 12A through 12C.

3.1 Third Embodiment

Figure 12A:
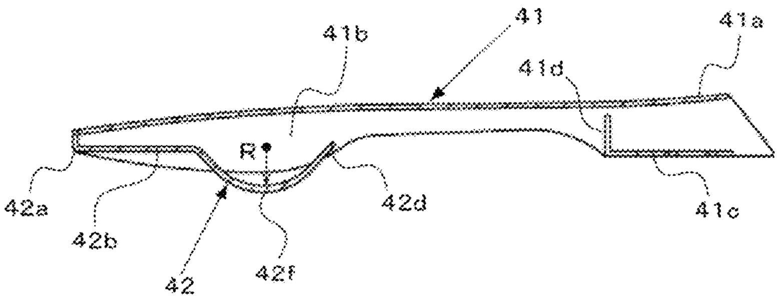
FIG. 12A is a cross-sectional view illustrating a clip body configuring a clip of a retractable writing instrument according to a third embodiment of the present invention.

FIG. 12A illustrates a clip body 41 and a holding portion 42 configuring a clip of a retractable writing instrument according to the third embodiment of the present invention. The clip body 41 and the holding portion 42 are integrally provided using one metal plate. In the holding portion 42, an arc-shaped projecting portion 42*f* is formed. The arc-shaped projecting portion 42*f* projects from the beam 42*b* in the direction of the surface of the barrel 2. The projecting portion 42*f* has an apex preferably with a radius R of curvature of more than 0.5 mm and more preferably more than 1.5 mm. The projecting portion 42*f* has a rear end in the form of a free end 42*d*. Such an arc-shaped projecting portion 42*f* functions in a similar manner as the V-shaped projecting portion 42*c* illustrated in FIGS. 4A through 4C. The rear end portion including the free end 42*d* of the holding portion 42 in the present embodiment may be provided with the wider portion 42*e* illustrated in FIGS. 8A through 8C.

3.2 Fourth Embodiment

Figure 12B:
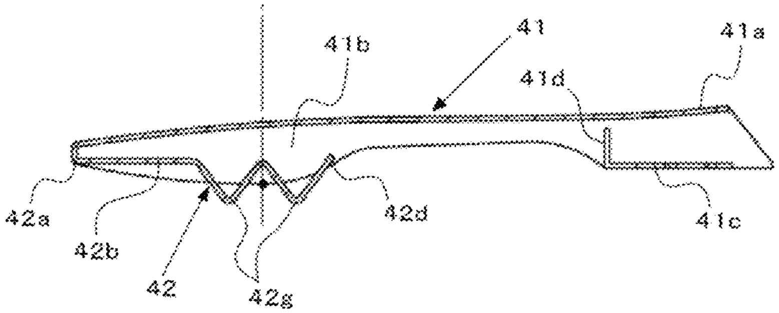
FIG. 12B is a cross-sectional view illustrating a clip body configuring a clip of a retractable writing instrument according to a fourth embodiment of the present invention.

FIG. 12B illustrates a clip body 41 and a holding portion 42 configuring a clip of a retractable writing instrument according to the fourth embodiment of the present invention. The clip body 41 and the holding portion 42 are integrally provided using one metal plate. In the holding portion 42, a W-shaped projecting portion 42*g* is formed. The W-shaped projecting portion 42*g* projects from the beam 42*b* in the direction of the surface of the barrel 2. The W-shaped projecting portion 42*g* has two apices. The two apices of the projecting portion 42*g* has a boundary in the form of a lowest valley. The valley of the projecting portion 42*g* is preferably located on a straight line passing through the highest part in each of the side walls 41*b* configuring the ball portion. The black dot in FIG. 12B represents the highest part in each of the side walls 41*b*. The dash-dotted line in FIG. 12B represents the straight line passing through the highest part in each of the side walls 41*b*. The valley of the projecting portion 42*g* in the present embodiment is located on the dash-dotted line passing through the black dot in FIG. 12B. The projecting portion 42*g* has a rear end in the form of a free end 42*d*. Such a W-shaped projecting portion 42*g* functions in a similar manner as the V-shaped projecting portion 42*c* illustrated in FIGS. 4A through 4C. The rear end portion including the free end 42*d* of the holding portion 42 in the present embodiment may be provided with the wider portion 42*e* illustrated in FIGS. 8A through 8C.

3.3 Fifth Embodiment

Figure 12C:
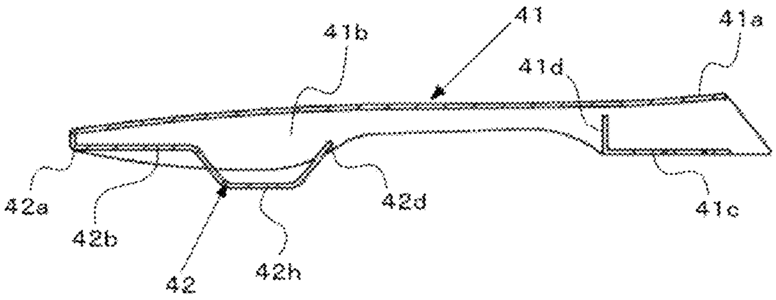
FIG. 12C is a cross-sectional view illustrating a clip body configuring a clip of a retractable writing instrument according to a fifth embodiment of the present invention.

FIG. 12C illustrates a clip body 41 and a holding portion 42 configuring a clip of a retractable writing instrument according to the fifth embodiment of the present invention. The clip body 41 and the holding portion 42 are integrally provided using one metal plate. In the holding portion 42, an inverted trapezoidal projecting portion 42*h* is formed. The inverted trapezoidal projecting portion 42*h* projects from the beam 42*b* in the direction of the surface of the barrel 2. The projecting portion 42*h* has a rear end in the form of a free end 42*d*. Such an inverted trapezoidal projecting portion 42*h* functions in a similar manner as the V-shaped projecting portion 42*c* illustrated in FIGS. 4A through 4C. The rear end portion including the free end 42*d* of the holding portion 42 in the present embodiment may be provided with the wider portion 42*e* illustrated in FIGS. 8A through 8C.

4. Material for Clip Body and Holding Portion

The clip body 41 and the holding portion 42 are not limited to the configuration integrally provided using one metal plate. The clip body 41 and the holding portion 42 may have the configuration, for example, illustrated in FIG. 13A or 13B.

4.1 Sixth Embodiment

Figure 13A:
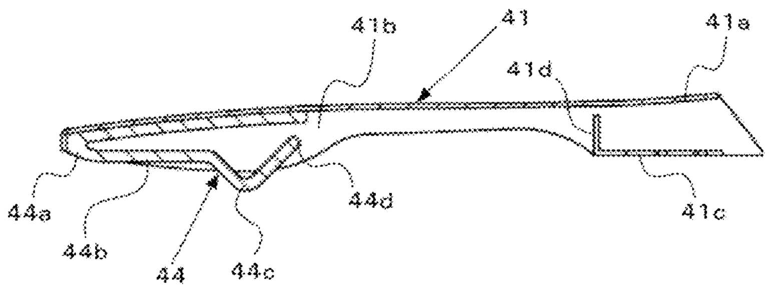
FIG. 13A is a cross-sectional view illustrating a clip body configuring a clip of a retractable writing instrument according to a sixth embodiment of the present invention.

FIG. 13A illustrates a clip body 41 and a holding portion 44 configuring a clip of a retractable writing instrument according to the sixth embodiment of the present invention. The clip body 41 is configured by bending one metal plate. The holding portion 44 is integrally molded using a synthetic resin. The holding portion 44 made of a synthetic resin has, similar to the holding portion 42 illustrated in FIGS. 4A through 4C, a fixed end 44*a*, a beam 44*b*, a projecting portion 44*c*, and a free end 44*d*. The holding portion 44 made of a synthetic resin is fixed to the back surface of the upper wall 41*a* of the clip body 41 made of metal. The holding portion 44 is fixed to the back surface of the upper wall 41*a* by, for example, adhesion or fitting. Such a holding portion 44 made of a synthetic resin functions in a similar manner as the holding portion 42 made of metal illustrated in FIGS. 4A through 4C.

4.2 Seventh Embodiment

Figure 13B:
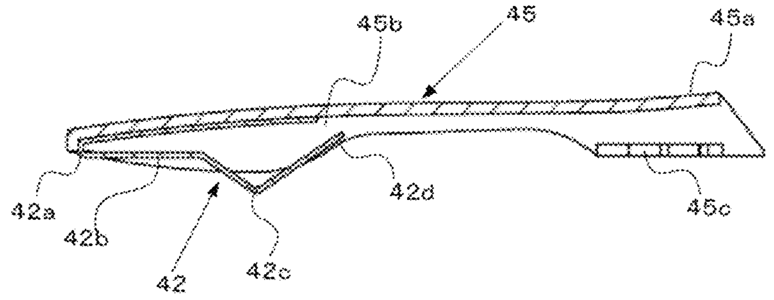
FIG. 13B is a cross-sectional view illustrating a clip body configuring a clip of a retractable writing instrument according to a seventh embodiment of the present invention.

FIG. 13B illustrates a clip body 45 and a holding portion 42 configuring a clip of a retractable writing instrument according to the seventh embodiment of the present invention. The clip body 45 is integrally molded using a synthetic resin. The holding portion 42 is configured by bending one metal plate. The clip body 45 made of a synthetic resin has, similar to the clip body 41 illustrated in FIGS. 4A through 4C, an upper wall 45*a*, a pair of side walls 45*b*, and a pair of engagement portions 45*c*. The holding portion 42 made of metal is fixed to the back surface of the upper wall 45*a* of the clip body 45 made of a synthetic resin. The holding portion 42 is fixed to the back surface of the upper wall 45*a* by, for example, adhesion or fitting. Such a holding portion 42 made of metal functions in a similar manner as the holding portion 42 made of metal illustrated in FIGS. 4A through 4C.

5. Improvement in Guide Groove

The guide groove 23*f* provided in the intermediate barrel 23 is not limited to the configuration illustrated in FIGS. 7A and 7B in the first embodiment described above.

Figure 14A:
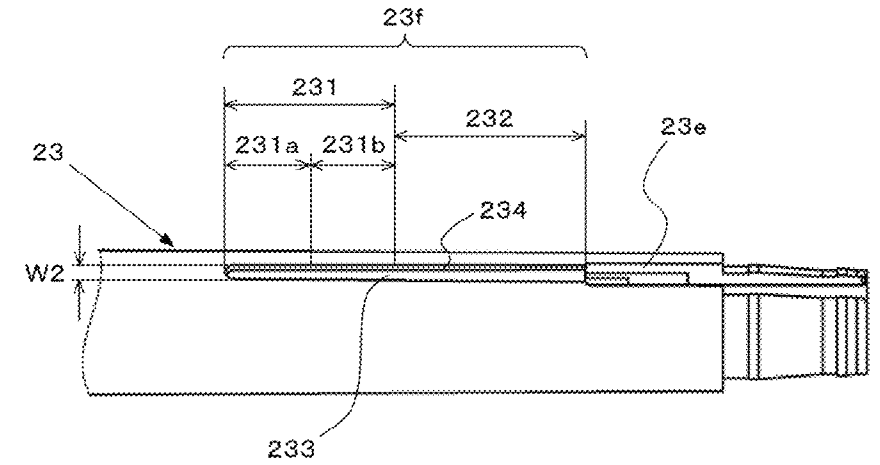
FIGS. 14A and 14B illustrate the intermediate barrel configuring the retractable writing instrument in the first embodiment.
Figure 14B:
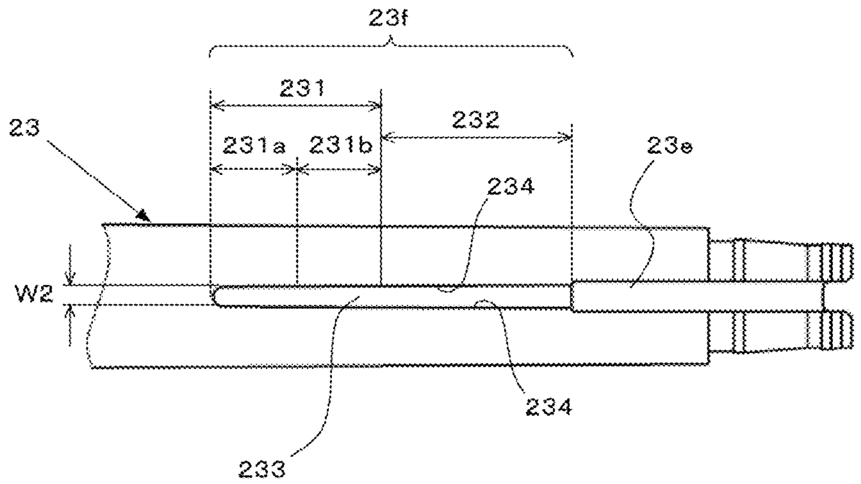

5.2 Technical Problem of Retractable Writing Instrument According to First Embodiment As illustrated in FIGS. 14A and 14B, the guide groove 23*f* in the first embodiment includes the first and second regions 231 and 232. As already described, the first region 231 is used for sliding the clip 4 to retract and project the pen point 61 (refer to FIGS. 1B and 2B). That is, when the pen point 61 is retracted and projected, the clip 4 is longitudinally moved in the range of the length of the first region 231.

Figure 15A:
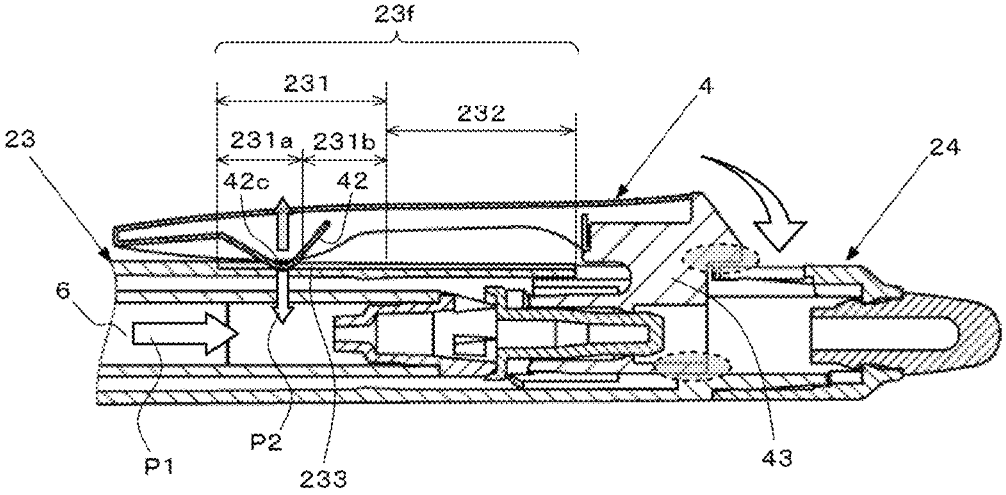
FIGS. 15A and 15B illustrate an internal configuration of the retractable writing instrument in the first embodiment.
Figure 15B:
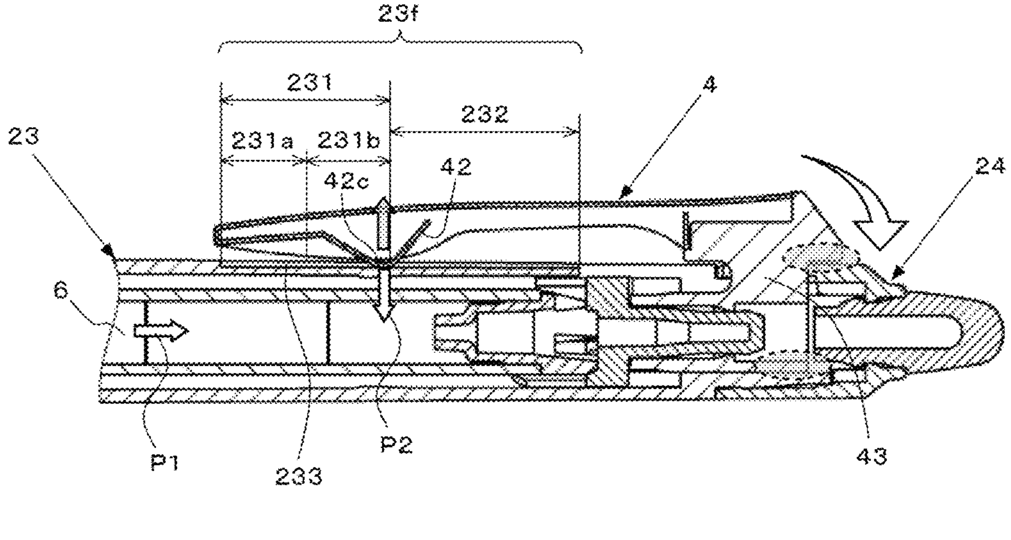

In this context, FIGS. 15A and 15B illustrate the internal configuration of the retractable writing instrument 1 according to the first embodiment. FIG. 15A illustrates the state of the pen point 61 projecting from the barrel 2. FIG. 15B illustrates the state of the pen point 61 being retracted into the barrel 2.

As illustrated in FIG. 15A, when the pen point 61 projects from the barrel 2, the holding portion 42 of the clip 4 is located in a front half portion 231*a* of the first region 231. Meanwhile, as illustrated in FIG. 15B, when the pen point 61 is retracted into the barrel 2, the holding portion 42 of the clip 4 is located in a rear half portion 231*b* of the first region 231.

The guide groove 23*f* in the first embodiment has the bottom surface 233 in the rear half portion 231*b* of the first region 231. There is thus a rare case where rearward movement of the clip 4 is stopped immediately before the pen point 61 is in a state of complete retraction illustrated in FIG. 15B. That is, the retractable writing instrument 1 according to the first embodiment has a technical problem of not securely performing normal movement of the clip 4 to cause the pen point 61 to be in the retracted state.

With reference to FIGS. 15A and 15B, the reasons for such a technical problem are described. As illustrated in FIG. 15A, the clip 4 is slid rearward of the barrel 2 by a biasing force P1 of the spring 5 (refer to FIGS. 1B and 2B) mounted in the front end portion of the writing tool body 6. Meanwhile, the holding portion 42 of the clip 4 produces an elastic force P2 on the bottom surface 233 of the guide groove 23*f*. As a result, the clip 4 receives a reaction force (refer to the gray arrow in FIGS. 15A and 15B) in the direction opposite to the elastic force P2 from the bottom surface 233. Due to the reaction force in the direction opposite to the elastic force P2, the clip 4 becomes in a state of being tilted with the clip base 43 as a fulcrum. The tilted clip base 43 is pressed against a surface and an inner surface of the intermediate barrel 23 and the rear barrel 24 to produce frictional resistance (refer to areas surrounded by the broken lines in FIGS. 15A and 15B).

In the projected state of the pen point 61 illustrated in FIG. 15A, the frictional resistance of the clip base 43 exhibits a preferred effect of inhibiting a rattle of the clip 4. The frictional resistance of the clip base 43, however, causes a problem of stopping the rearward movement of the clip 4 immediately before the pen point 61 becomes in the completely retracted state illustrated in FIG. 15B.

The reason for stopping the rearward movement of the clip 4 is not only the elastic force P2 of the holding portion 42. Variation of the biasing force P1 in accordance with the expansion and contraction of the spring 5 is also a reason for stopping the rearward movement of the clip 4. That is, the biasing force P1 of the spring 5 becomes larger with the contraction of the spring 5 and becomes smaller with the expansion of the spring 5. The biasing force P1 of the spring 5 is thus maximum in the projected state of the pen point 61 illustrated in FIG. 15A and minimum in the retracted state of the pen point 61 illustrated in FIG. 15B. In the process from the projected state to the retracted state of the pen point 61, if the biasing force P1 of the spring 5 is not more than the frictional resistance of the clip base 43, the rearward movement of the clip 4 is stopped by the frictional resistance of the clip base 43.

In order to solve such a problem, it is considered to increase the biasing force P1 of the spring 5. However, an increase in the biasing force P1 of the spring 5 causes a greater force to be used to slide the clip 4 forward of the barrel 2 and reduction in the operability to retract and project the pen point 61. Accordingly, the problem of stopping the rearward movement of the clip 4 is desirably solved not by increasing the biasing force P1 of the spring 5.

5.3 Eighth Embodiment

With reference to FIGS. 16A through 18B, a retractable writing instrument according to the eighth embodiment of the present invention is described below. The retractable writing instrument according to the eighth embodiment includes the configuration to solve the problem of stopping the rearward movement of the clip 4.

5.3.1 Configuration of Guide Groove

Figure 16A:
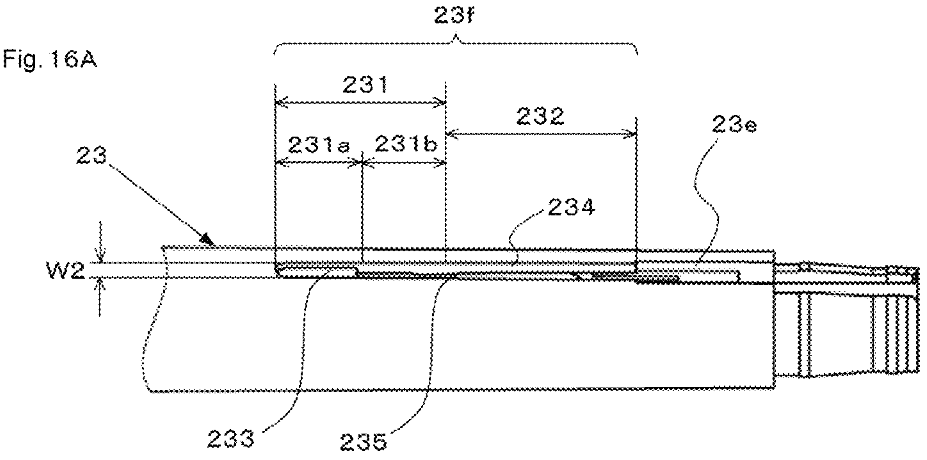
FIGS. 16A, 16B, and 16C illustrate an intermediate barrel configuring a retractable writing instrument according to an eighth embodiment of the present invention.
Figure 16B:
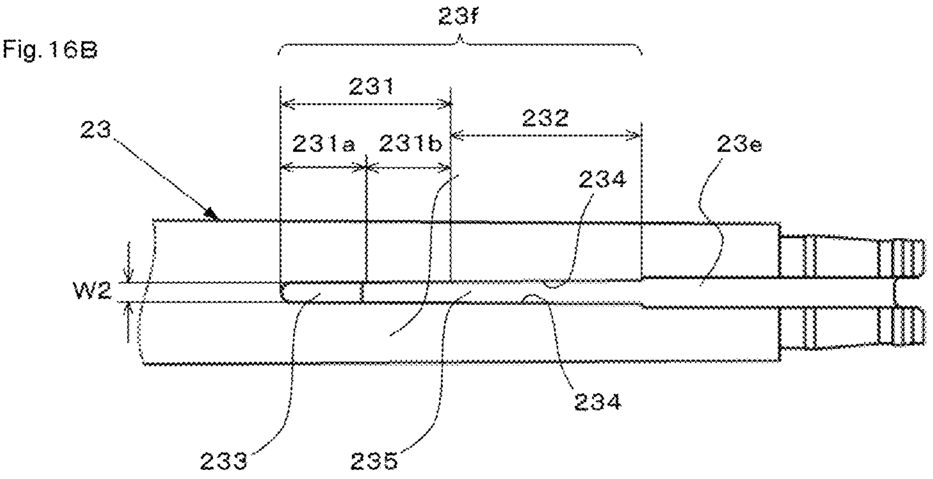
Figure 16C:
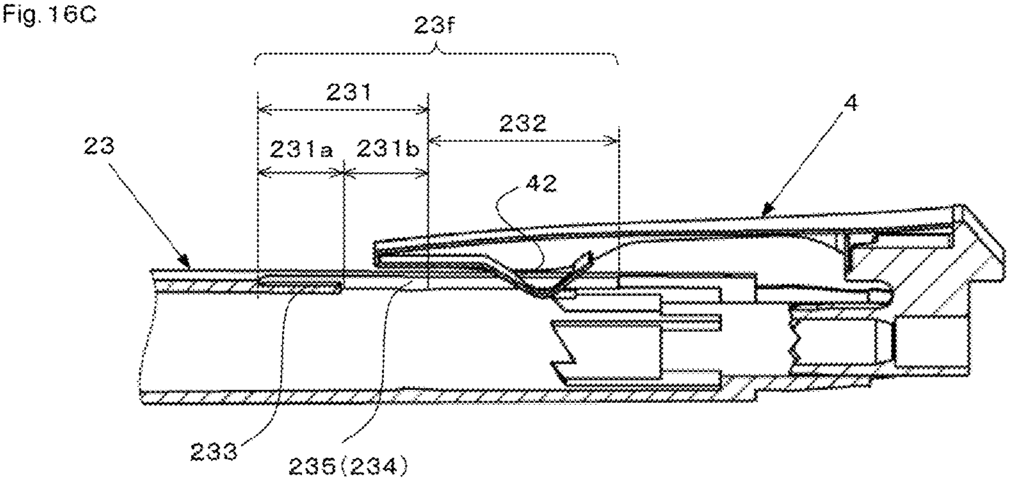

FIGS. 16A, 16B, and 16C illustrate an intermediate barrel 23 of the retractable writing instrument according to the eighth embodiment. The retractable writing instrument according to the eighth embodiment is characterized in the configuration of a guide groove 23*f* provided in the intermediate barrel 23. The guide groove 23*f* is configured with a bottom surface 233, a pair of side surfaces 234, and a through groove 235.

The bottom surface 233 of the guide groove 23*f* is not an essential component but is formed in an area other than the rear half portion 231*b* of the first region 231 in the guide groove 23*f*. The bottom surface 233 is preferably formed in the front half portion 231*a* of the first region 231. In this case, the bottom surface 233 has substantially the same length as that of the front half portion 231*a*. The bottom surface 233 in the present embodiment has a length slightly shorter than the total length of the front half portion 231*a* of the first region 231. That is, as illustrated in FIG. 17A, the bottom surface 233 has a minimum length capable of contacting the projecting portion 42*c* configuring the holding portion 42 of the clip 4 when the pen point 61 is in the projected state.

The through groove 235 of the guide groove 23*f* is formed at least in the rear half portion 231*b* of the first region 231. The through groove 235 in the present embodiment is formed across the entire area from the first region 231 to the second region 232 excluding the bottom surface 233 and continues to the first long hole 23*e*.

5.3.2 Technical Effects of Guide Groove

Figure 17A:
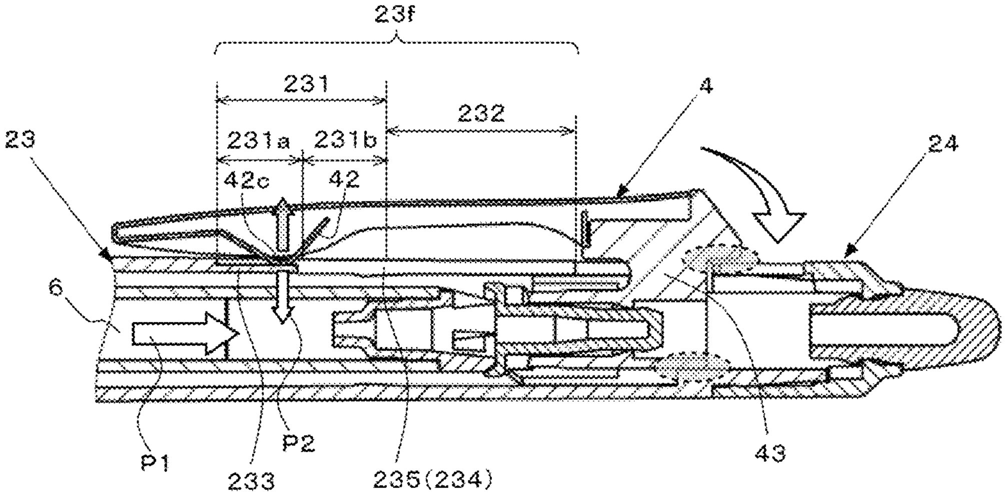
FIGS. 17A and 17B illustrate an internal configuration of the retractable writing instrument in the eighth embodiment.

In the projected state of the pen point 61 illustrated in FIG. 17A, the projecting portion 42*c* configuring the holding portion 42 of the clip 4 is located in the front half portion 231*a* of the first region 231 of the guide groove 23*f*. The projecting portion 42*c* contacting the bottom surface 233 of the guide groove 23*f* causes the holding portion 42 of the clip 4 to produce the elastic force P2 on the bottom surface 233 of the guide groove 23*f*. As a result, the clip 4 receives a reaction force (refer to the gray arrow in FIG. 17A) in the direction opposite to the elastic force P2 from the bottom surface 233. Due to the reaction force in the direction opposite to the elastic force P2, the clip 4 becomes in a state of being tilted with the clip base 43 as a fulcrum. The tilted clip base 43 is pressed against the surface and the inner surface of the intermediate barrel 23 and the rear barrel 24 to produce frictional resistance (refer to areas surrounded by the broken lines in FIG. 17A).

The frictional resistance of the clip base 43 exhibits a preferred effect of inhibiting a rattle of the clip 4. That is, the bottom surface 233 formed in the front half portion 231*a* of the first region 231 of the guide groove 23*f* prevents a rattle of the clip 4 in the projected state of the pen point 61.

Figure 2A:
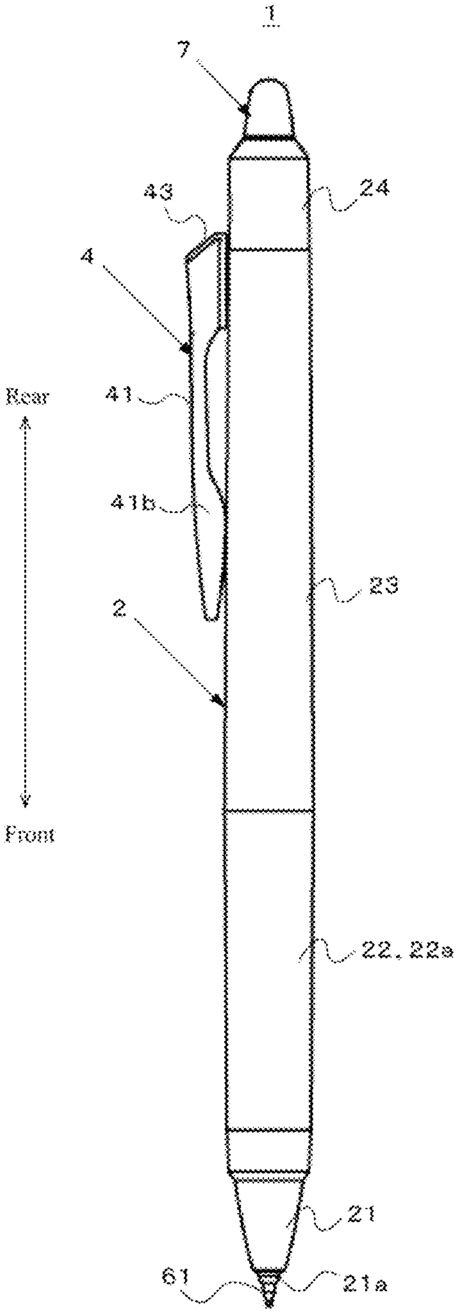
FIGS. 2A and 2B illustrate the retractable writing instrument in a state of the pen point projecting from the barrel.
Figure 2B:
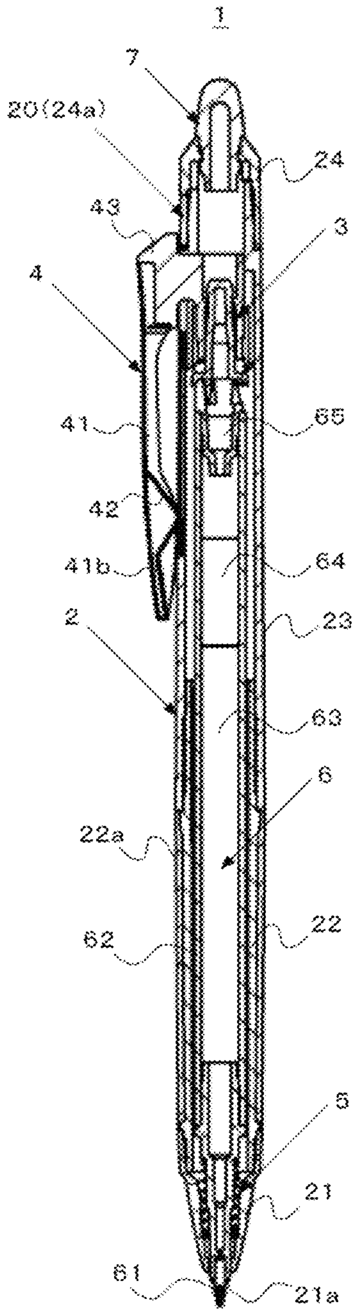
Figure 17B:
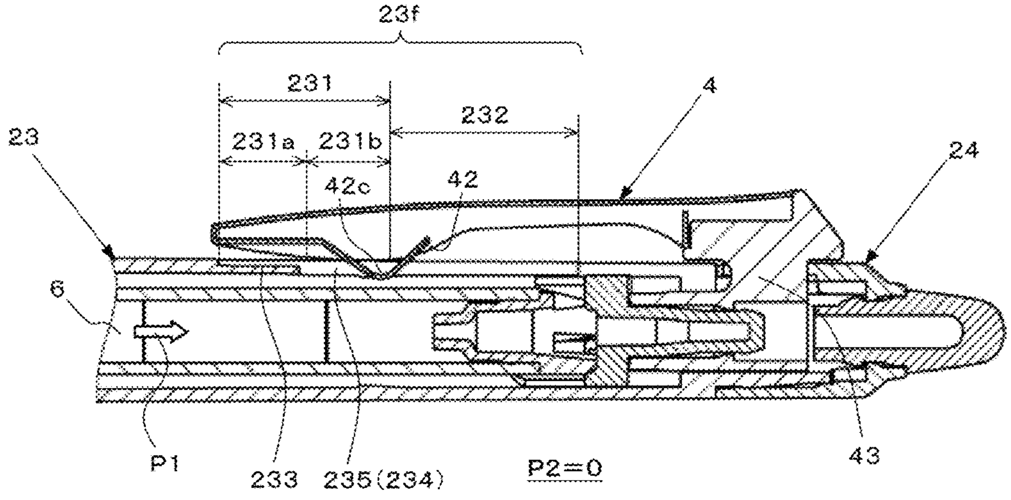

Then, the projected state of the pen point 61 illustrated in FIG. 17A is transferred to the retracted state of the pen point 61 illustrated in FIG. 17B by sliding the clip 4 forward of the barrel 2 (refer to FIG. 2A). In the process of transfer from the projected state to the retracted state of the pen point 61, the clip 4 is slid rearward of the barrel 2 by the biasing force P1 of the spring 5 (refer to FIGS. 1B and 2B) mounted in the front end portion of the writing tool body 6.

In the process of transfer from the projected state to the retracted state of the pen point 61, the projecting portion 42*c* configuring the holding portion 42 of the clip 4 fits into the through groove 235 from above the bottom surface 233 in a position passing through the boundary between the front half portion 231*a* and the rear half portion 231*b* in the first region 231 of the guide groove 23*f*. After that, the holding portion 42 of the clip 4 moves to the boundary between the rear half portion 231*b* of the first region 231 and the second region 232 along the through groove 235. This causes the pen point 61 to be in the completely retracted state illustrated in FIG. 17B.

As illustrated in FIG. 17B, formation of the through groove 235 in the guide groove 23*f* causes the holding portion 42 of the clip 4 not to produce the elastic force P2 during transfer from the projected state to the retracted state of the pen point 61. This causes the reaction force in the direction opposite to the elastic force P2 to be zero and the frictional resistance of the clip base 43 to be zero. Accordingly, the guide groove 23*f* in the present embodiment prevents the rearward movement of the clip 4 from being stopped immediately before the pen point 61 is in the completely retracted state illustrated in FIG. 17B. That is, in the retractable writing instrument according to the present embodiment, normal movement of the clip 4 is securely performed for the pen point 61 to be in the retracted state.

As illustrated in FIG. 16C, the through groove 235 formed in the second region 232 of the guide groove 23*f* is used when the clip 4 is assembled to the intermediate barrel 23. In the process of assembling the clip 4 to the intermediate barrel 23, the projecting portion 42*c* configuring the holding portion 42 of the clip 4 passes through the first long hole 23*e* and is guided to the first region 231 by the through groove 235 formed in the second region 232 of the guide groove 23*f*. This allows the clip 4 to be assembled to the intermediate barrel 23 without causing the projecting portion 42*c* made of metal to contact the surface of the intermediate barrel 23.

5.3.3 Preferred Configuration of Guide Groove

Figure 18A:
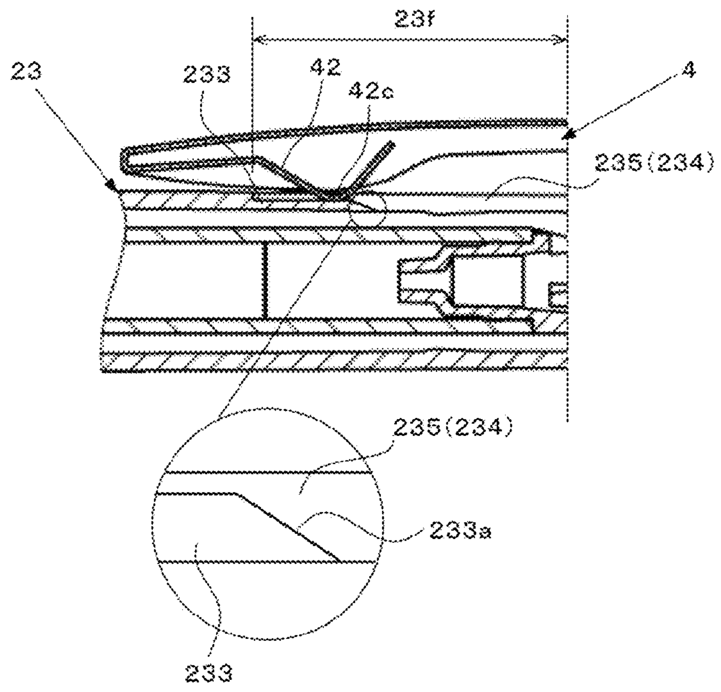
FIG. 18A is an enlarged view of FIG. 17A.

Preferably, as illustrated in FIG. 18A, an inclined surface 233*a* down to the through groove 235 is formed at a rear end of the bottom surface 233 of the guide groove 23*f*. Such an inclined surface 233*a* allows the projecting portion 42*c* configuring the holding portion 42 of the clip 4 to smoothly go up and down the bottom surface 233. This allows smooth sliding operation of the clip 4 to retract and project the pen point 61.

Figure 18B:
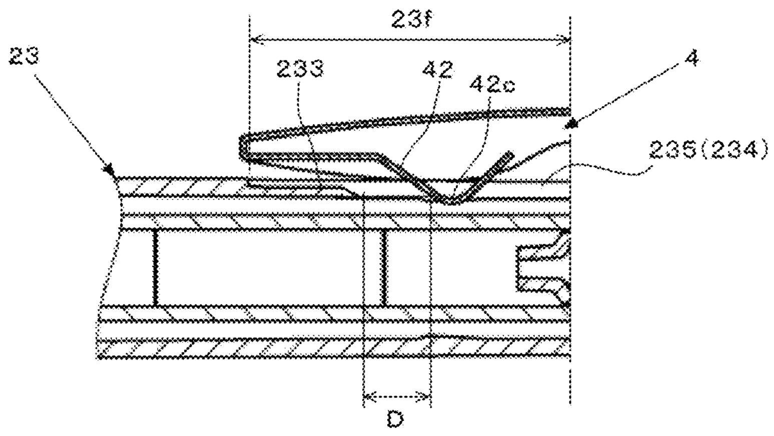
FIG. 18B is an enlarged view of FIG. 17B.

Preferably, as illustrated in FIG. 18B, in the retracted state of the pen point 61, a distance D is formed between the rear end of the bottom surface 233 of the guide groove 23*f* and the projecting portion 42*c* of the clip 4. Due to the distance D, the projecting portion 42*c* of the clip 4 fits into the through groove 235 before the pen point 61 becomes in the completely retracted state illustrated in FIG. 17B, and the elastic force P2 of the holding portion 42 becomes zero. Moreover, due to the distance D, the surface of the holding portion 42 does not contact the rear end of the bottom surface 233, and in the process of transfer from the projected state to the retracted state of the pen point 61, frictional resistance is not produced between the surface of the holding portion 42 and the rear end of the bottom surface 233. Such a technical effect of the distance D more securely prevents the rearward movement of the clip 4 from being stopped.

5.4 Ninth Embodiment

Then, with reference to FIGS. 19A through 20B, a retractable writing instrument according to the ninth embodiment of the present invention is described.

Figure 19A:
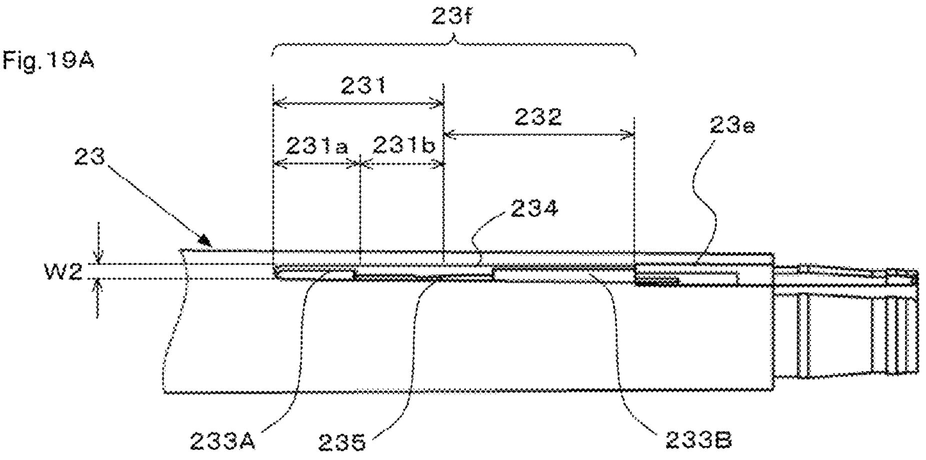
FIGS. 19A, 19B, and 19C illustrate an intermediate barrel configuring a retractable writing instrument according to a ninth embodiment of the present invention.
Figure 19B:
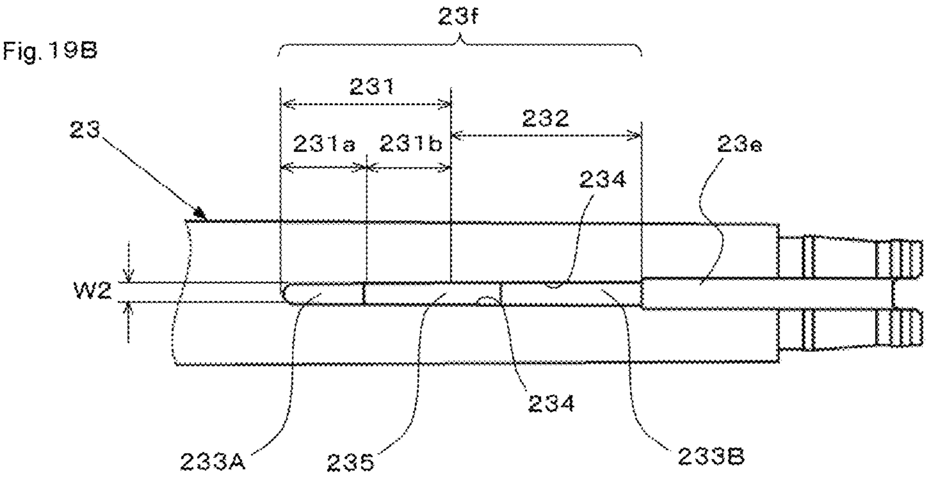
Figure 19C:
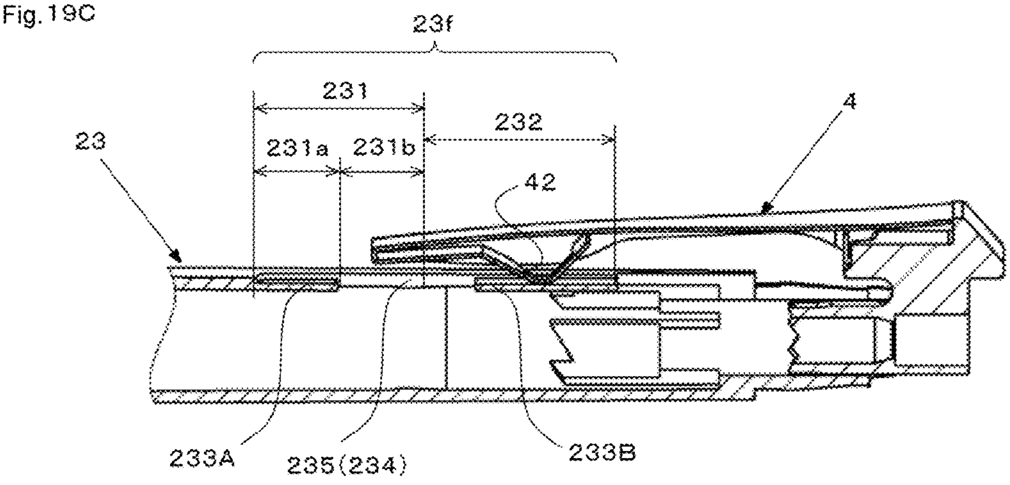

FIGS. 19A, 19B, and 19C illustrate an intermediate barrel 23 of the retractable writing instrument according to the ninth embodiment. A guide groove 23*f* of the retractable writing instrument according to the ninth embodiment has a first bottom surface 233A, a through groove 235, and a second bottom surface 233B. Similar to the eighth embodiment described above, the first bottom surface 233A is formed in the front half portion 231*a* of the first region 231. The second bottom surface 233B is formed in the second region 232. The through groove 235 is formed between the first bottom surface 233A and the second bottom surface 233B. The through groove 235 in the present embodiment has a length from a rear end of the first bottom surface 233A, through the boundary between the first region 231 and the second region 232, reaching a front end of the second bottom surface 233B. The guide groove 23*f* in the present embodiment also exhibits technical effects similar to those in the eighth embodiment described above.

Figure 20A:
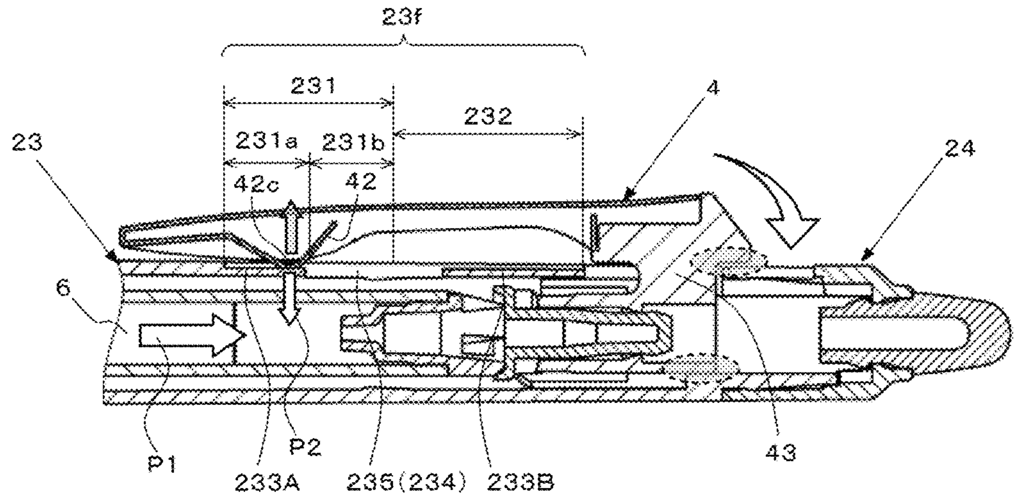
FIGS. 20A and 20B illustrate an internal configuration of the retractable writing instrument in the ninth embodiment.

That is, in the projected state of the pen point 61 illustrated in FIG. 20A, the projecting portion 42*c* of the clip 4 contacts the first bottom surface 233A of the guide groove 23*f* to cause the holding portion 42 of the clip 4 to produce the elastic force P2 on the first bottom surface 233A of the guide groove 23*f*. Due to a reaction force (refer to the gray arrow in FIG. 20A) in the direction opposite to the elastic force P2, the clip 4 becomes in a state of being tilted with the clip base 43 as a fulcrum. The tilted clip base 43 is pressed against the surface and the inner surface of the intermediate barrel 23 and the rear barrel 24 to produce frictional resistance (refer to areas surrounded by the broken lines in FIG. 20A). The frictional resistance of the clip base 43 exhibits a preferred effect of inhibiting a rattle of the clip 4.

In the process of transfer from the projected state to the retracted state of the pen point 61, the projecting portion 42*c* of the clip 4 fits into the through groove 235 from above the first bottom surface 233A in a position passing through the boundary between the front half portion 231*a* and the rear half portion 231*b* in the first region 231 of the guide groove 23*f*. After that, the holding portion 42 of the clip 4 moves to the boundary between the rear half portion 231*b* of the first region 231 and the second region 232 along the through groove 235. This allows the pen point 61 to be in the completely retracted state illustrated in FIG. 20B.

Figure 20B:
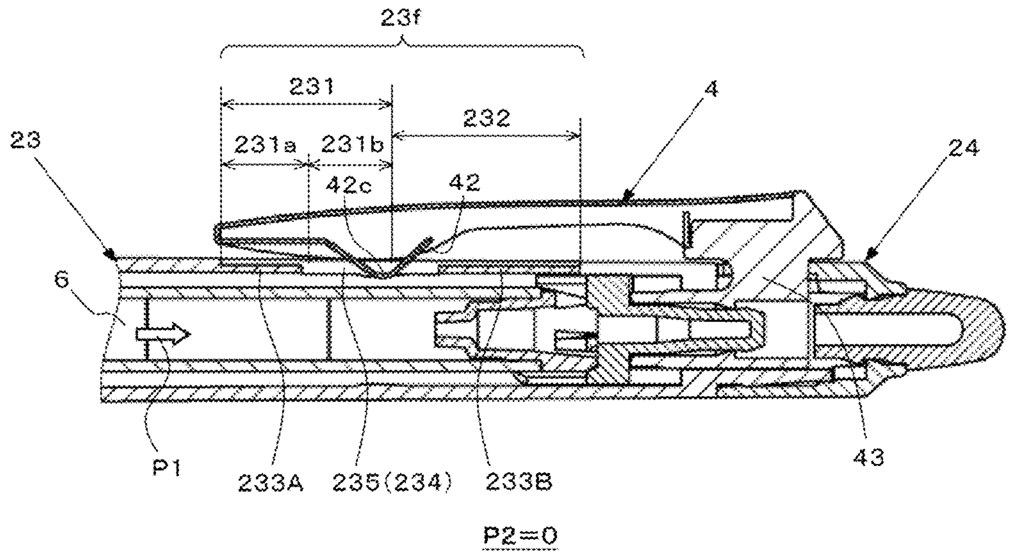

As illustrated in FIG. 20B, formation of the through groove 235 in the guide groove 23*f* causes the holding portion 42 of the clip 4 not to produce the elastic force P2 during transfer from the projected state to the retracted state of the pen point 61. This causes the reaction force in the direction opposite to the elastic force P2 to be zero and also the frictional resistance of the clip base 43 to be zero. Accordingly, the guide groove 23*f* in the present embodiment prevents the rearward movement of the clip 4 from being stopped immediately before the pen point 61 becomes in the completely retracted state illustrated in FIG. 20B. That is, in the retractable writing instrument according to the present embodiment, normal movement of the clip 4 is securely performed for the pen point 61 to be in the retracted state.

As illustrated in FIG. 19C, the second region 232 of the guide groove 23*f* is used when the clip 4 is assembled to the intermediate barrel 23. In the process of assembling the clip 4 to the intermediate barrel 23, the projecting portion 42*c* configuring the holding portion 42 of the clip 4 passes through the first long hole 23*e* and is guided to the first region 231 by the second region 232 of the guide groove 23*f*. This allows the clip 4 to be assembled to the intermediate barrel 23 without causing the projecting portion 42*c* made of metal to contact the surface of the intermediate barrel 23.

Moreover, formation of the second bottom surface 233B in the second region 232 of the guide groove 23*f* improves the rigidity of the rear side portion of the intermediate barrel 23. That is, in the rear side portion of the intermediate barrel 23, the through groove 235 and the first long hole 23*e* are formed. As illustrated in FIG. 16B, continuation of the through groove 235 and the first long hole 23*e* causes the rear side portion of the intermediate barrel 23 to have reduced rigidity and readily deflect. The second bottom surface 233B illustrated in FIG. 19B breaks the continuation of the through groove 235 and the first long hole 23*e* to improve the rigidity of the rear side portion of the intermediate barrel 23. This causes the rear side portion of the intermediate barrel 23 to be less likely to deflect and allows a transfer film to be efficiently adhered to the surface of the intermediate barrel 23.

5.5 Tenth Embodiment

Figure 21A:
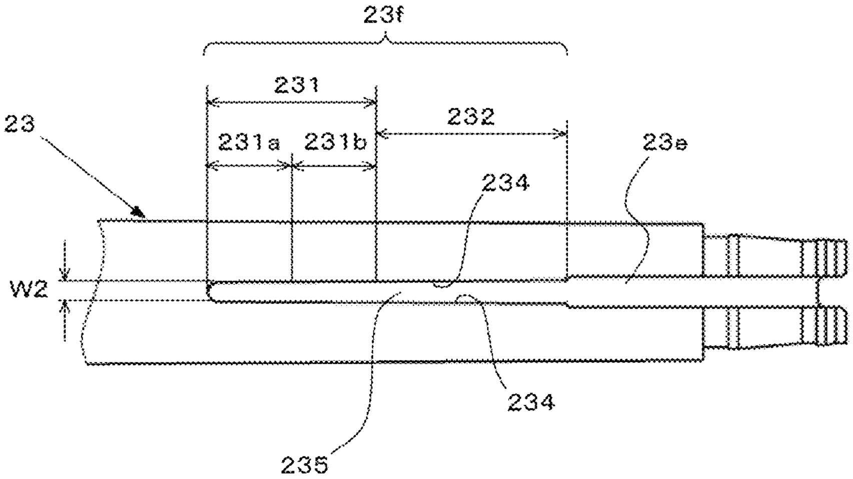
FIG. 21A is a plan view illustrating a rear side portion of an intermediate barrel configuring a retractable writing instrument according to a tenth embodiment of the present invention.

Then, with reference to FIG. 21A, a retractable writing instrument according to the tenth embodiment of the present invention is described.

FIG. 21A illustrates an intermediate barrel 23 of the retractable writing instrument according to the tenth embodiment. A guide groove 23*f* of the retractable writing instrument according to the tenth embodiment has no bottom surface 233 and is configured with a through groove 235 and a pair of side surfaces 234. The through groove 235 in the present embodiment is formed across the entire area from the first region 231 to the second region 232 and continues to the first long hole 23*e*.

The guide groove 23*f* illustrated in FIG. 21A constantly causes the holding portion 42 of the clip 4 not to produce the elastic force P2 regardless of the state of the pen point 61. This causes the reaction force in the direction opposite to the elastic force P2 to be zero and also the frictional resistance of the clip base 43 to be zero. Accordingly, the rearward movement of the clip 4 is prevented from being stopped. That is, in the retractable writing instrument according to the present embodiment, normal movement of the clip 4 is securely performed for the pen point 61 to be in the retracted state.

The through groove 235 formed in the second region 232 of the guide groove 23*f* is used when the clip 4 is assembled to the intermediate barrel 23. In the process of assembling the clip 4 to the intermediate barrel 23, the projecting portion 42*c* configuring the holding portion 42 of the clip 4 passes through the first long hole 23*e* and is guided to the first region 231 by the through groove 235 formed in the second region 232 of the guide groove 23*f*. This allows the clip 4 to be assembled to the intermediate barrel 23 without causing the projecting portion 42*c* made of metal to contact the surface of the intermediate barrel 23.

5.6 Eleventh Embodiment

Figure 21B:
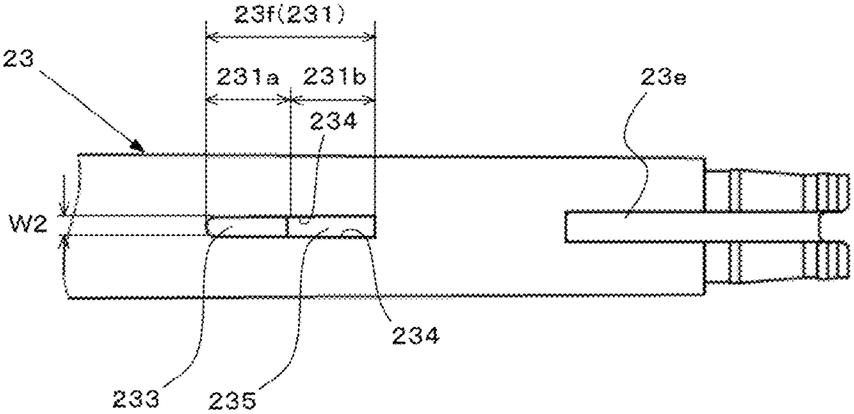
FIG. 21B is a plan view illustrating a rear side portion of an intermediate barrel configuring a retractable writing instrument according to an eleventh embodiment of the present invention.

Then, with reference to FIG. 21B, a retractable writing instrument according to the eleventh embodiment of the present invention is described.

FIG. 21B illustrates an intermediate barrel 23 of the retractable writing instrument according to the eleventh embodiment. A guide groove 23*f* of the retractable writing instrument according to the eleventh embodiment only has a first region 231 and has no second region 232. In a front half portion 231*a* of the first region 231, a bottom surface 233 is formed. In a rear half portion 231*b* of the first region 231, a through groove 235 is formed. The guide groove 23*f* in the present embodiment also exhibits technical effects similar to those in the eighth embodiment described above.

That is, in the projected state of the pen point 61, the projecting portion 42*c* of the clip 4 contacts the bottom surface 233 of the guide groove 23*f* to cause the holding portion 42 of the clip 4 to produce the elastic force P2 (refer to FIG. 17A) on the bottom surface 233 of the guide groove 23*f*. Due to the reaction force in the direction opposite to the elastic force P2, the clip 4 becomes in a state of being tilted with the clip base 43 as a fulcrum. The tilted clip base 43 is pressed against the surface and the inner surface of the intermediate barrel 23 and the rear barrel 24 to produce frictional resistance. The frictional resistance of the clip base 43 exhibits a preferred effect of inhibiting a rattle of the clip 4.

In the process of transfer from the projected state to the retracted state of the pen point 61, the projecting portion 42*c* of the clip 4 fits into the through groove 235 from above the bottom surface 233 in a position passing through the boundary between the front half portion 231*a* and the rear half portion 231*b* in the first region 231 of the guide groove 23*f*. After that, the holding portion 42 of the clip 4 moves rearward of the rear half portion 231*b* of the first region 231 along the through groove 235. This causes the pen point 61 to be in the completely retracted state.

As illustrated in FIG. 21B, formation of the through groove 235 in the guide groove 23*f* causes the holding portion 42 of the clip 4 not to produce the elastic force P2 during transfer from the projected state to the retracted state of the pen point 61. This causes the reaction force in the direction opposite to the elastic force P2 to be zero and also the frictional resistance of the clip base 43 to be zero. Accordingly, the guide groove 23*f* in the present embodiment prevents the rearward movement of the clip 4 from being stopped immediately before the pen point 61 becomes in the completely retracted state. That is, in the retractable writing instrument according to the present embodiment, normal movement of the clip 4 is securely performed for the pen point 61 to be in the retracted state.

Moreover, the guide groove 23*f* having no second region 232 breaks the continuation of the through groove 235 in the first region 231 and the first long hole 23*e*. This improves the rigidity of the rear side portion of the intermediate barrel 23. As a result, the rear side portion of the intermediate barrel 23 becomes less likely to deflect and it is possible to efficiently adhere a transfer film to the surface of the intermediate barrel 23.

DESCRIPTION OF REFERENCE NUMERALS

1 Writing Instrument
2 Barrel
20 Slide Hole
21 Tip
21*a* Front End Hole
22 Front Barrel
22*a* Grip
23 Intermediate Barrel
23*a* Cam Gear
23*b* Cam Groove
23*e* First Long Hole
23*f* Guide Groove
231 First Region
231*a* Front Half Portion
231*b* Rear Half Portion
232 Second Region
233 Bottom Surface
233A First Bottom Surface
233B Second Bottom Surface
233*a* Inclined Surface
234 Side Surface
235 Through Groove
24 Rear Barrel
24*a* Second Long Hole
24*b* Attachment Hole
3 Rotary Member
31 Convex Thread
4 Clip
41,45 Clip Body
41*a*, 45*a* Upper Wall
41*b*, 45*b* Side Wall
41*c*, 45*c* Engagement Portion
41*d* Stopper Wall
42, 44 Holding Portion
42*a*, 44*a* Fixed End
42*b*, 44*b* Beam
42*c*, 42*f*, 42*g*, 42*h*, 44*c* Projecting Portion
42*d*, 44*d* Free End
42*e* Wider Portion
43 Clip Base
43*a* Slider
43*b* Engagement Groove
43*c* Coupling Portion
43*d* Cylindrical Portion
43*e* Cam Gear
5 Spring
6 Writing Tool Body
61 Pen Point
62 Ink Storage Tube
63 Thermochromic Ink
64 Follower
65 End Plug
7 Friction Unit
D Distance

The invention claimed is:

1. A retractable writing instrument, comprising a pen point, a clip, and a barrel, the pen point being configured to be in a state of projecting from the barrel or a state of being retracted into the barrel by sliding the clip in a longitudinal direction of the barrel, wherein the clip includes a clip body, a holding portion, and a clip base, the clip body includes one upper wall extending in the longitudinal direction of the barrel and a pair of side walls formed at least on a front side of the upper wall, projecting from both side portions of the upper wall in a direction of a surface of the barrel, and having inner surfaces facing each other, the holding portion is provided on a back side of the clip body and between the pair of side walls, has a shape capable of producing an elastic force by deformation, and projects more in the direction of the surface of the barrel than the pair of side walls, the surface of the barrel includes a guide groove extending in the longitudinal direction of the barrel and provided with a pair of side surfaces to restrict lateral movement of the holding portion, the clip base is connected to a rear side of the clip body and supports the clip body at a height not to cause the pair of side walls to contact the surface of the barrel, the upper wall of the clip body has a shape with an increasing width from the front side to a rear side, the pair of side walls of the clip body are formed from a front end to a rear end of the upper wall, on a rear side of the pair of side walls, a pair of engagement portions are formed projecting inside the clip body, at a front end of the pair of engagement portions, a pair of stopper walls are formed projecting toward a back surface of the upper wall, and the pair of engagement portions engage with both sides of the clip base and the pair of stopper walls abut on a front surface of the clip base.

2. The retractable writing instrument according to claim 1, wherein the holding portion is made with an elastically deformable plate member extending in the longitudinal direction of the barrel, includes a fixed end located at a front end of the holding portion, a beam extending rearward from the fixed end, and a projecting portion bent from the beam in the direction of the surface of the barrel, and has a width to fit at least the projecting portion between the pair of side surfaces of the guide groove.

3. The retractable writing instrument according to claim 2, wherein the holding portion has a free end at a rear end, the beam is configured to make first elastic deformation using the fixed end as a fulcrum, and the projecting portion is configured to make second elastic deformation after the free end contacts a back surface of the clip body.

4. The retractable writing instrument according to claim 3, wherein a rear end portion including the free end of the holding portion has a width of ½ or more distance between the pair of side walls of the clip body.

5. The retractable writing instrument according to claim 1, wherein the clip body is configured by bending one metal plate.

6. The retractable writing instrument according to claim 1, wherein the clip body and the holding portion are configured by bending one metal plate.

7. The retractable writing instrument according to claim 1, wherein the guide groove includes a first region to longitudinally guide the holding portion during sliding of the clip, and a bottom surface is formed at least in a front half portion of the first region, and the clip base supports the clip body at a height to cause the holding portion to contact the bottom surface of the guide groove.

8. The retractable writing instrument according to claim 7, wherein the guide groove includes a second region continued to a rear of the first region, and the bottom surface is formed across an entire area from the first region to the second region.

9. The retractable writing instrument according to claim 8, wherein on a rear side of the barrel, a slide hole is provided to cause the clip base to slide in the longitudinal direction of the barrel, and the second region of the guide groove is in communication with a front end of the slide hole.

10. The retractable writing instrument according to claim 1, wherein the guide groove includes a first region to longitudinally guide the holding portion during sliding of the clip, and a through groove is formed at least in a rear half portion of the first region, and the clip base supports the clip body at a height to cause the holding portion to fit into the through groove of the guide groove.

11. The retractable writing instrument according to claim 10, wherein the guide groove includes a second region continued to a rear of the first region, and the through groove is formed across an entire area from the first region to the second region.

12. The retractable writing instrument according to claim 11, wherein on a rear side of the barrel, a slide hole is provided to cause the clip base to slide in the longitudinal direction of the barrel, and the second region of the guide groove is in communication with a front end of the slide hole.

* * * * *